(12) United States Patent
McCorkle et al.

(10) Patent No.: US 7,010,056 B1
(45) Date of Patent: *Mar. 7, 2006

(54) SYSTEM AND METHOD FOR GENERATING ULTRA WIDEBAND PULSES

(75) Inventors: John W. McCorkle, Laurel, MD (US); James E. Thompson, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 856 days.

This patent is subject to a terminal disclaimer.

(21) Appl. No.: 09/685,205

(22) Filed: Oct. 10, 2000

(51) Int. Cl.
*H04L 27/04* (2006.01)

(52) U.S. Cl. ............... 375/295; 375/286; 375/289; 398/183

(58) Field of Classification Search ........... 375/286, 375/289, 259; 398/183
See application file for complete search history.

(56) References Cited

U.S. PATENT DOCUMENTS

| | | | |
|---|---|---|---|
| 5,506,862 A * | 4/1996 | McIntosh | 375/130 |
| 5,583,892 A | 12/1996 | Drakul et al. | |
| 5,677,927 A | 10/1997 | Fullerton | |
| 6,026,125 A | 2/2000 | Larrick, Jr. et al. | |
| 6,198,777 B1 * | 3/2001 | Feher | 375/295 |
| 6,351,246 B1 | 2/2002 | McCorkle | |
| 6,505,032 B1 | 1/2003 | McCorkle | |
| 6,559,996 B1 * | 5/2003 | Miyamoto et al. | 398/183 |
| 6,700,939 B1 | 3/2004 | McCorkle | |
| 6,735,238 B1 * | 5/2004 | McCorkle | 375/130 |
| 6,862,317 B1 * | 3/2005 | Mohan et al. | 375/238 |

FOREIGN PATENT DOCUMENTS

| | | |
|---|---|---|
| EP | 0 851 603 | 7/1998 |
| WO | WO 00/41372 | 7/2000 |
| WO | WO 01/93520 | 12/2001 |

OTHER PUBLICATIONS

U.S. Appl. No. 60/207,225, filed May 26, 2000, McCorkle.
U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.

(Continued)

*Primary Examiner*—Shuwang Liu
(74) *Attorney, Agent, or Firm*—Posz Law Group, PLC

(57) ABSTRACT

An ultra-wide band (UWB) waveform generator and encoder for use in a UWB digital communication system. The UWB waveform is made up of a sequence of shaped wavelets. The waveform generator produces multi-amplitude, multi-phase wavelets that are time-constrained, zero mean, and can be orthogonal in phase, yet still have a −10 dB power spectral bandwidth that is larger than the frequency of the peak of the power spectrum In one embodiment, the wavelets are bi-phase wavelets. The encoder multiplies each data bit by an n-bit identifying code, (e.g., a user code), resulting in a group of wavelets corresponding to each data bit. The identifying codeword is passed onto the UWB waveform generator for generation of a UWB waveform that can be transmitted via an antenna.

30 Claims, 22 Drawing Sheets

OTHER PUBLICATIONS

U.S. Appl. No. 09/685,196, filed Oct. 10, 2000, Miller.
U.S. Appl. No. 09/685,197, filed Oct. 10, 2000, Miller.
U.S. Appl. No. 09/685,198, filed Oct. 10, 2000, McCorkle.
U.S. Appl. No. 09/685,199, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
R. Comerford, IEEE Spectrum, pp. 35-41, "Handhelds Duke it Out for the Internet", Aug. 2000.

* cited by examiner

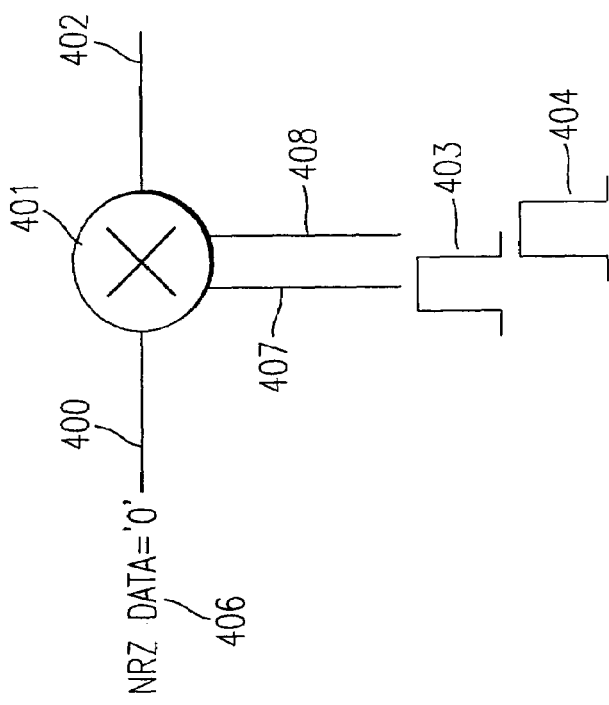
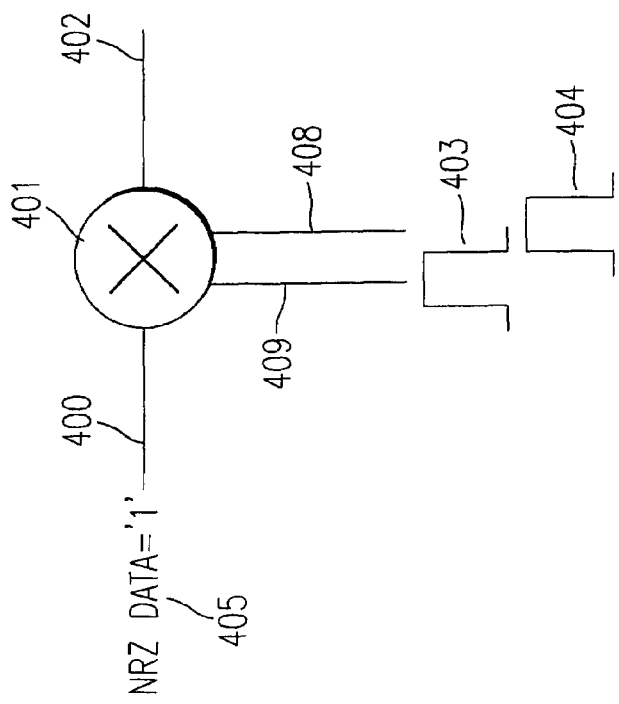

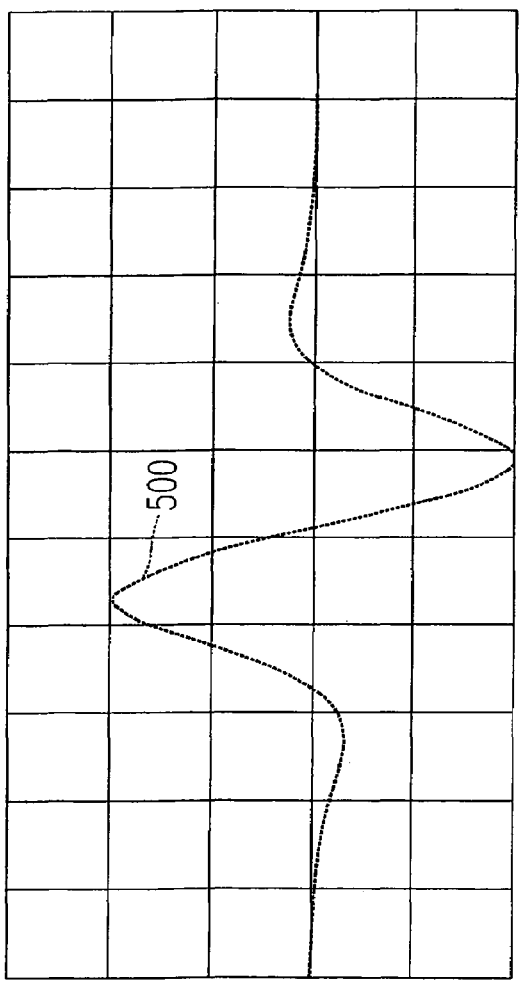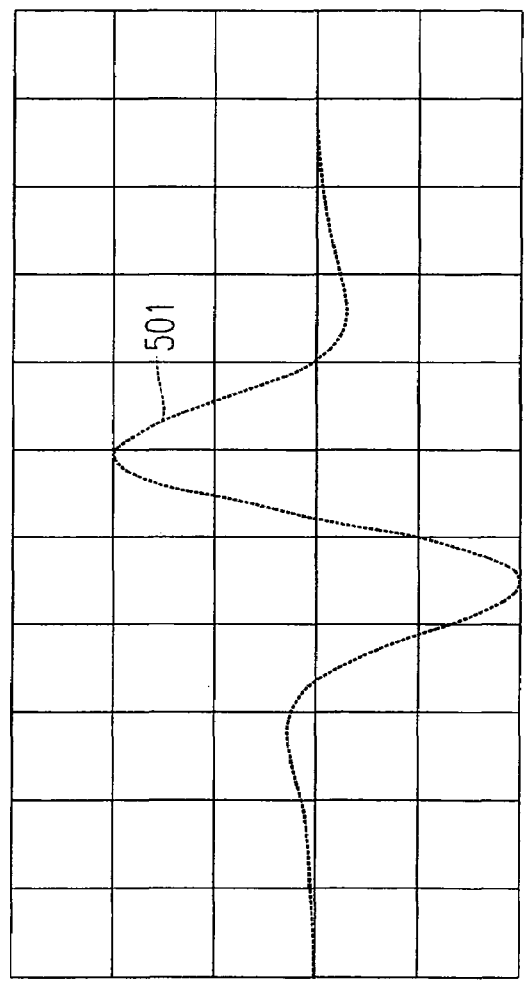

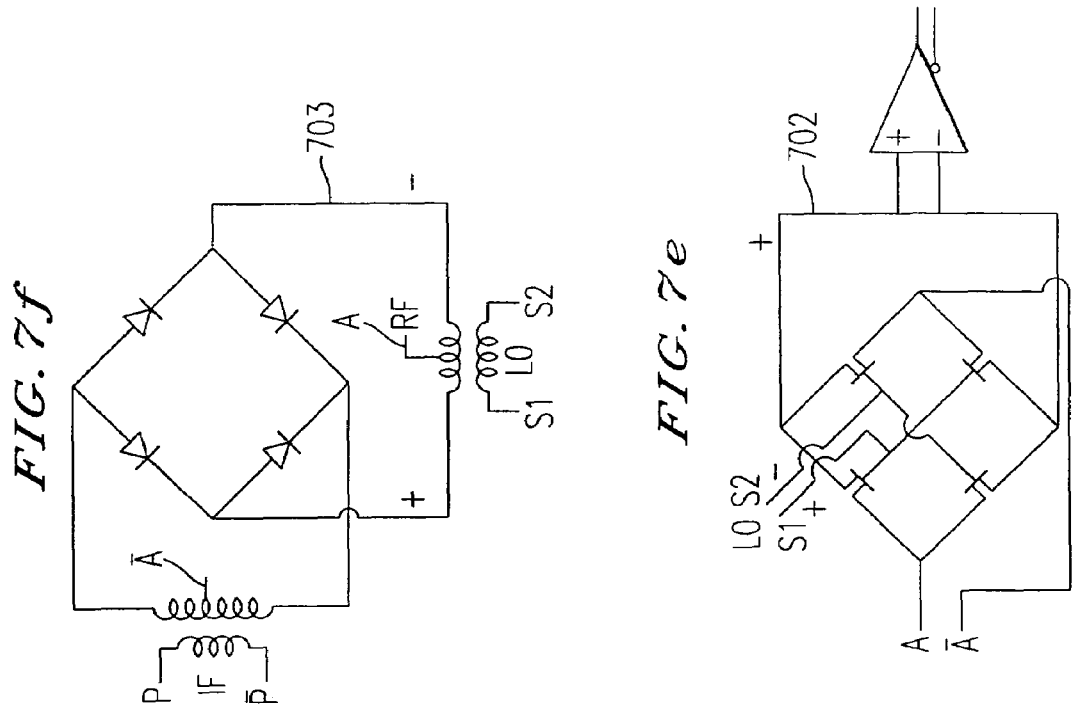
FIG. 7f
FIG. 7e
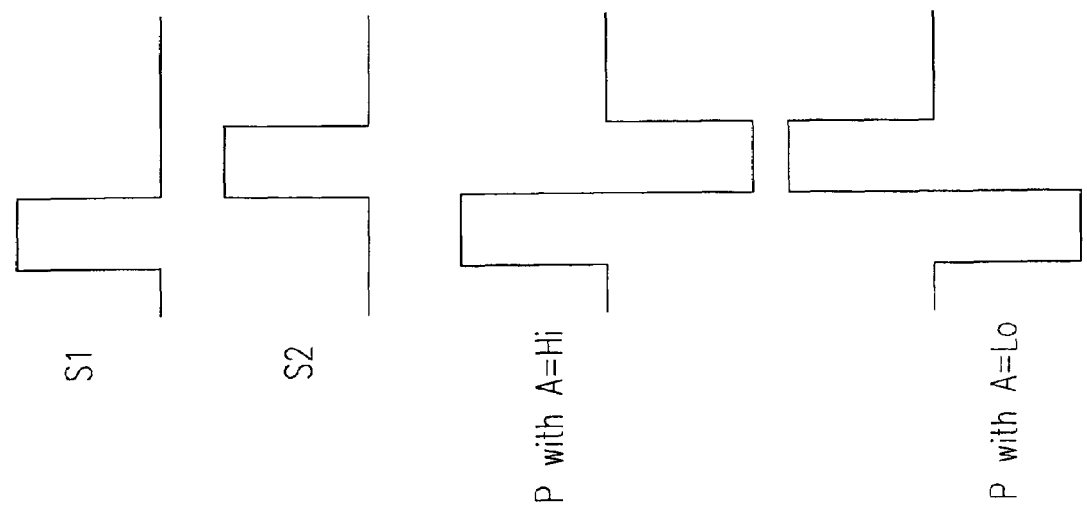
FIG. 7b
FIG. 7c
FIG. 7d

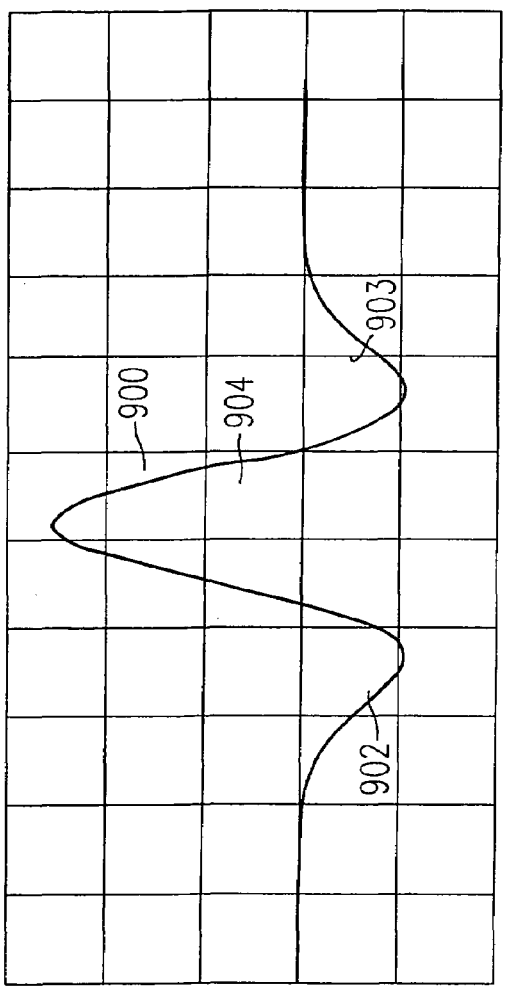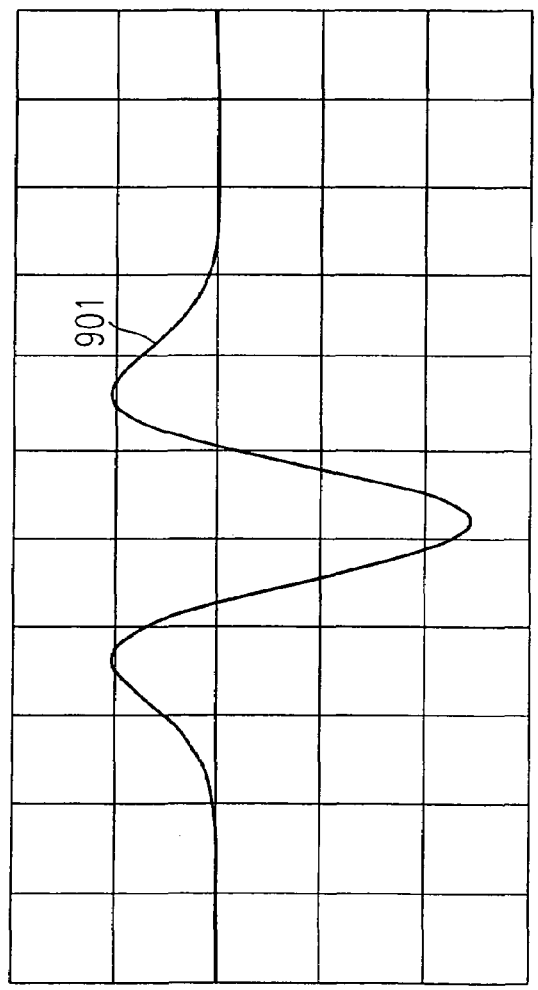

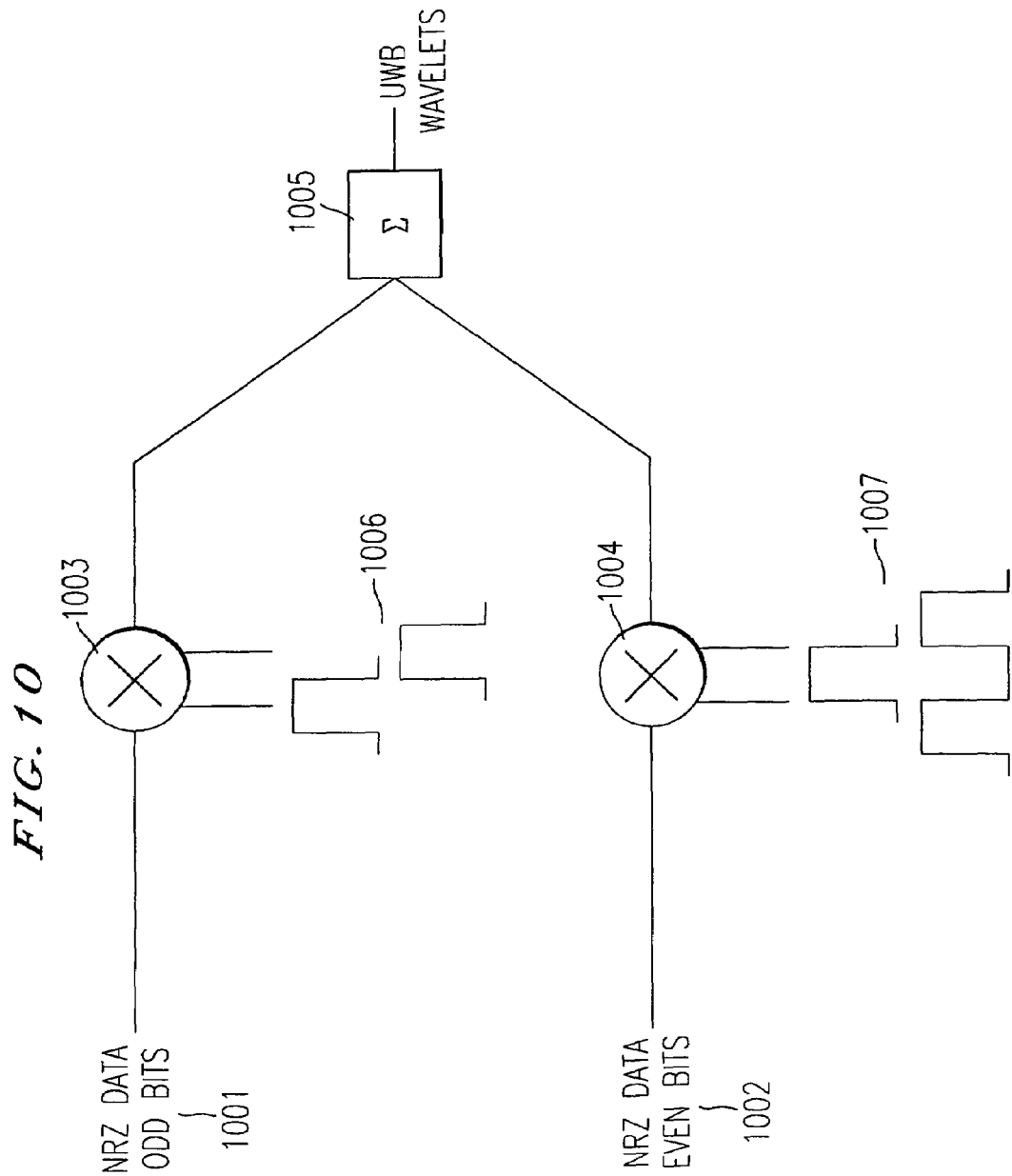

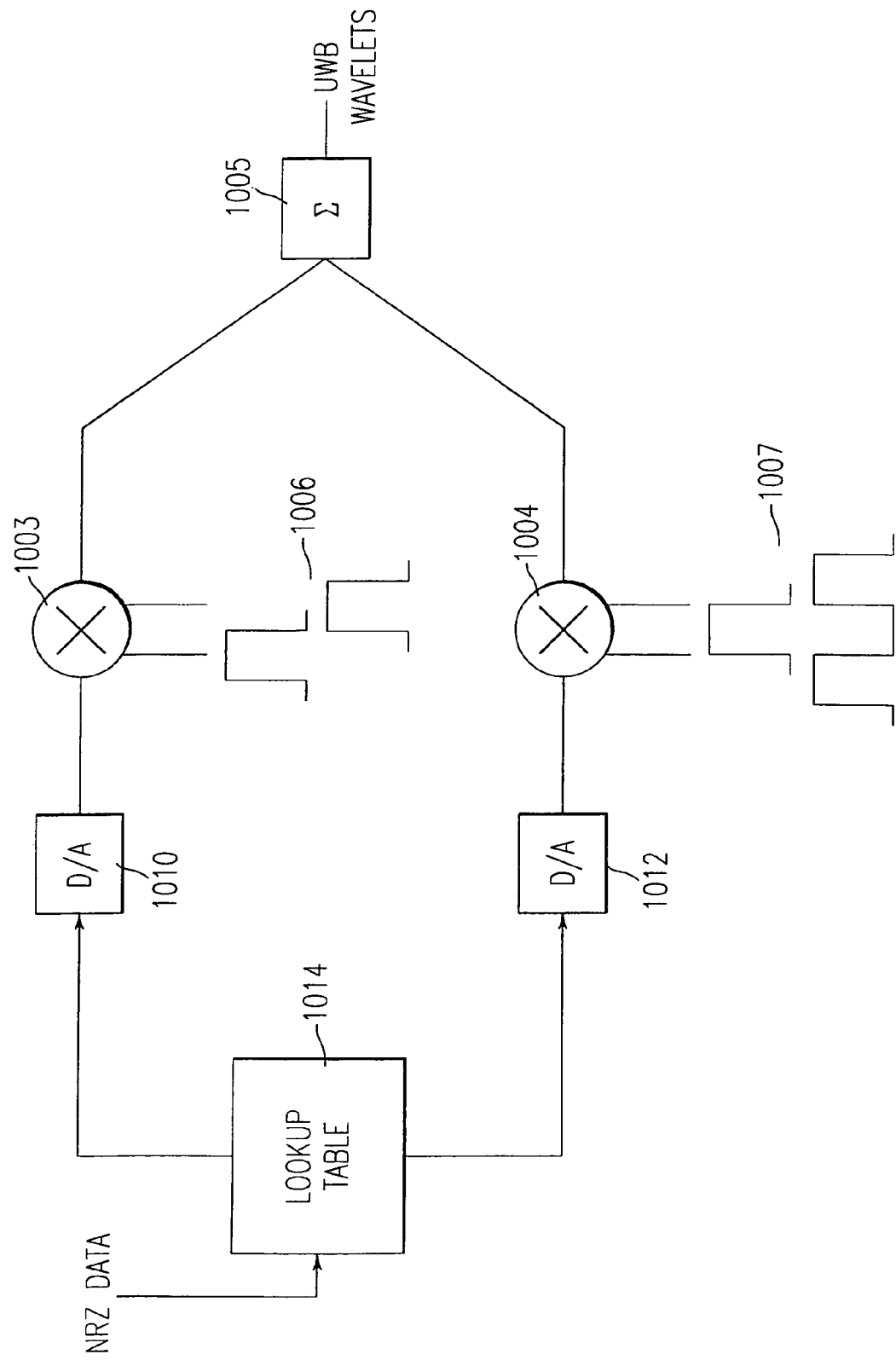
FIG. 10α

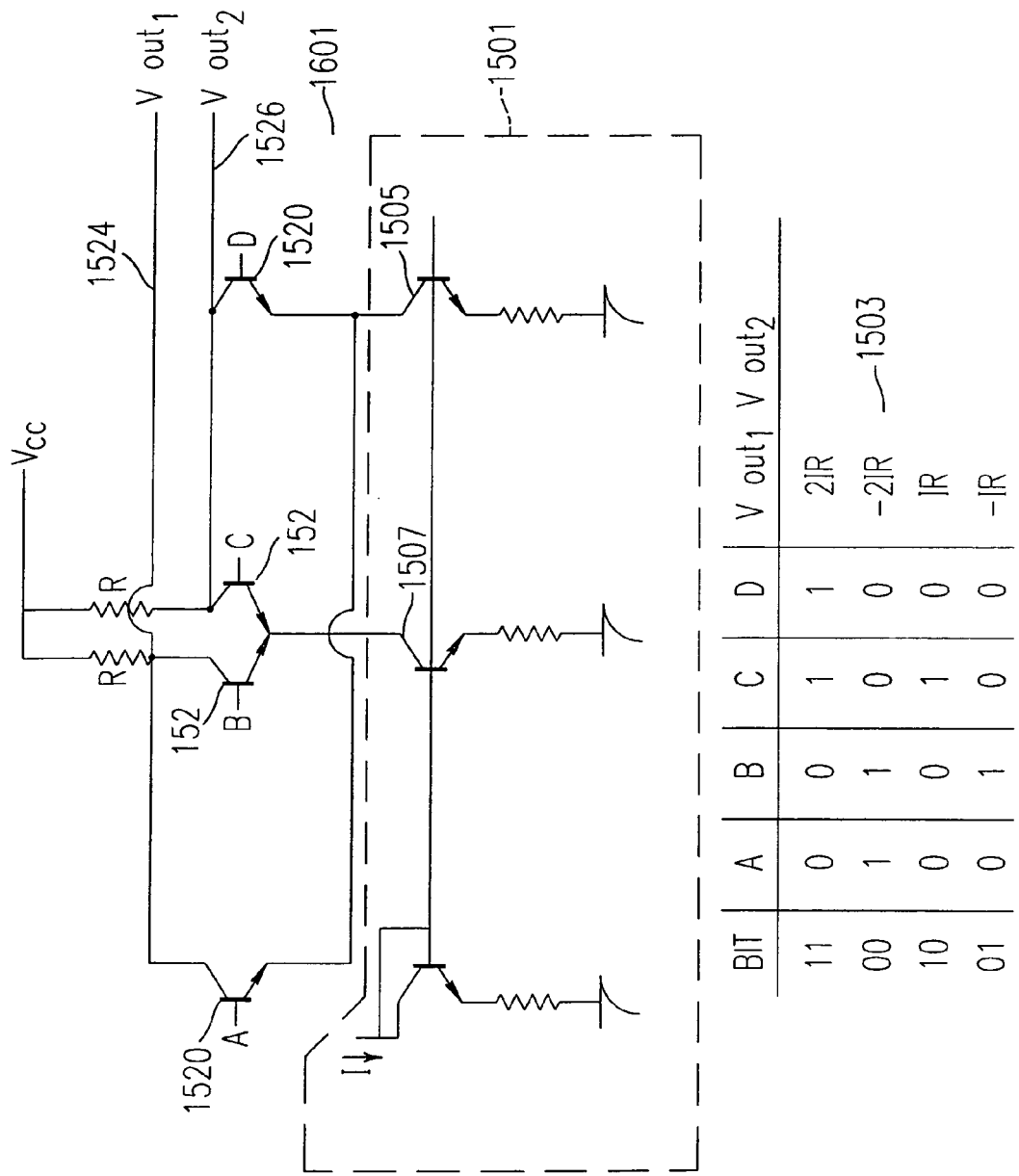

SYSTEM AND METHOD FOR GENERATING ULTRA WIDEBAND PULSES

BACKGROUND OF THE INVENTION

1. Field of the Invention

The present invention relates to ultra wideband radio communication systems, and in particular to methods, systems and devices for generating waveforms that include wavelets that are shaped and modulated to convey digital data over a wireless radio communication channel using ultra wideband signaling techniques.

2. Description of the Background

There are numerous radio communication techniques to transmit digital data over a wireless channel. These techniques include those used in mobile telephone systems, pagers, remote data collection systems, and wireless networks for computers, among others. Most conventional wireless communication techniques modulate the digital data onto a high-frequency carrier that is then transmitted via an antenna into space.

Ultra wideband (UWB) communications systems transmit carrierless high data rate, low power signals. Since a carrier is not used, it is necessary that the transmitted waveforms themselves contain the information being communicated. Accordingly, conventional UWB systems transmit pulses, the information to be communicated being contained in the pulses themselves, and not on a carrier.

Conventional UWB communication systems send a sequence of identical pulses, the timing of which contains the information being communicated, for example, as described by Fullerton and Cowie (U.S. Pat. No. 5,677,927). This technique is known as pulse position modulation (PPM). In a PPM scheme, the information in a pulse is obtained by determining an arrival time of the pulse at a receiver relative to other pulses. For example, given an exemplary time window, if a pulse is received at the beginning of that time window, the receiver will decode that to mean a '1' has been sent, whereas if the pulse is received at the end of that same time window, the receiver will decode that to mean that a '0' has been received.

Several problems arise with this technique, however. First, it is not as efficient as other techniques, for example, sending non-inverted and inverted pulses where 3 dB less radiated power is required to communicate in the same memory-less Gaussian white noise channel. Second, reflections from objects in the vicinity of the transmitter and receiver can cause a pulse that was supposed to be at the beginning of the time window, to appear in at the end of time window, or even in the time window of a subsequent pulse.

As a result, it would be advantageous if the data stream to be transmitted could be encoded by changing a shape of the UWB pulse rather than a position of the UWB pulse as with conventional systems. For example, if the UWB pulses had two possible shapes, a single time frame could be used encode a single bit of data, rather than the two time frames (i.e., early and late) that would be required by a PPM system. In the present UWB communications system, and related co-pending application Ser. No. 09/209,460 filed May 14, 1998, entitled ULTRA WIDE BANDWIDTH SPREAD SPECTRUM COMMUNICATIONS SYSTEM, now issued as U.S. Pat. No. 6,700,939, the entire contents of which being incorporated herein by reference, information is carried by the shape of the pulse, or the shape in combination with its position in the pulse-sequence.

Conventional techniques for generating pulses include a variety of techniques, for example, networks of transmission lines such as those described in co-pending application Ser. No. 09/209,460 filed May 14, 1998, entitled ULTRA WIDE BANDWIDTH SPREAD SPECTRUM COMMUNICATIONS SYSTEM now issued as U.S. Pat. No. 6,700,939. One of the problems associated with this technique is that the transmission lines take up sizeable space and accordingly, are not amenable to integration on a monolithic integrated circuit. Given that a key targeted use of UWB systems is for small, handheld mobile devices such as personal digital assistants (PDAs) and mobile telephones, space is at a premium when designing UWB systems. Furthermore, it is highly desirable to integrate the entire radio onto a single monolithic integrated circuit in order to meet the cost, performance, and volume-production requirements of consumer electronics devices.

A key attribute that must be maintained, however, regardless of how the information is carried, is that no tones can be present. In other words, the average power spectrum must be smooth and void of any spikes. In generating these UWB pulse streams, however, non-ideal device performance can cause tones to pass through to the antenna and to be radiated. In particular, switches, gates, and analog mixers that are used to generate pulses are well known to be non-ideal devices. Accordingly, leakage is a problem. A signal that is supposed to be blocked at certain times, for example, can continue to leak through. Similarly, non-ideal symmetry in positive and negative voltages or current directions can allow tones be generated or leak through. In another example, the output of a mixer can include not only the desired UWB pulse stream, but also spikes in the frequency domain at the clock frequency and its harmonics, as well as other noise, due to leakage between the RF, LO, and IF ports. This is problematic since one of the design objectives is to generate a pulse stream that will not interfere with other communications systems.

Similar problems to those discussed above regarding transmitters are also encountered in UWB receivers. Mixers are used in UWB receivers to mix the received signal with known waveforms so that the data transmitted may be decoded. As discussed above, the spectral spikes (DC and otherwise) introduced by the non-ideal analog mixers can make decoding of only moderately weak signals difficult or impossible.

Furthermore, UWB receivers often suffer from leakage of the UWB signal driving the mixer. These UWB drive signals can radiate into space and be received by the antenna where it can jam the desired UWB signal due to its very close proximity and large amplitude. This reception of the drive signal being used to decode the received signal can therefore cause a self-jamming condition wherein the desired signal becomes unintelligible.

The challenge, then, as presently recognized, is to develop a highly integratable approach for generating shape-modulated wavelet sequences that can be used in a UWB communications system to encode, broadcast, receive, and decode a data stream. It would be advantageous if the data stream to be transmitted could be encoded by changing a shape of the UWB pulse rather than a position of the UWB pulse as with conventional systems.

Furthermore, the challenge is to build such a wavelet generator where the smooth power spectrum calculated by using ideal components, is realized using non-ideal components. In other words, an approach to generating and receiving UWB waveforms that does not generate unwanted frequency domain spikes as a by-product, spikes that are prone to interfere with other communications devices or cause self-jamming, would be advantageous.

It would also be advantageous if the UWB waveform generation approach were to minimize the power consumption because many of the targeted applications for UWB communications are in handheld battery-operated mobile devices.

SUMMARY OF THE INVENTION

Accordingly, one object of this invention is to provide a novel programmable wavelet generator for generating a variety of wavelets for use in a UWB communication system. Another object of the present invention is to provide a novel approach to encoding data onto UWB wavelets by controlling the shape of the wavelets, rather than the time position of the wavelets.

The inventors of the present invention have recognized that a highly integratable UWB wavelet generator may be designed that uses an analog mixer and a pulse generator to create various shapes of UWB wavelets. The inventors of the present invention have also recognized that a single UWB wavelet can carry more than one bit of information by varying the shape of the wavelet (including magnitude), the position of the wavelet, or both, according to an encoding scheme.

These and other objects are achieved according to the present invention by providing a novel approach for generating wavelets that is highly integratable, and an approach to encoding data onto a UWB wavelet by controlling the shape of the wavelet, rather than the time position of the wavelet.

The wavelet generator is a circuit which is highly integratable and in one embodiment uses two pulse streams that provide an early pulse and late pulse respectively, from a pulse generation circuit, that when mixed with a positive or a negative voltage (from a non-return-to-zero (NRZ) data stream, for example) in a conventional differential mixer, creates a wavelet that is either positive or negative (i.e., non-inverted or inverted), accordingly. In other embodiments, the data to be encoded and the pulse streams generated by the pulse generator are manipulated so as to further change the shape of the resultant UWB wavelets. By mixing the pulse streams generated by the pulse generator with a stream of NRZ data (positive voltage for a '1', negative voltage for a '0'), a waveform having a sequence wavelets can be created that can be transmitted as a UWB signal. In a preferred embodiment, the conventional mixer is a Gilbert cell mixer. In other embodiments, the mixer is, for example, a diode bridge mixer, or any electrically, optically, or mechanically-driven configuration of switching devices including, for example, an FET, a bulk semiconductor device, or a micro-machine device.

Consistent with the title of this section, the above summary is not intended to be an exhaustive discussion of all the features or embodiments of the present invention. A more complete, although not necessarily exhaustive description of the features and embodiments of the invention is found in the section entitled "DESCRIPTION OF THE PREFERRED EMBODIMENTS."

BRIEF DESCRIPTION OF THE DRAWINGS

FIG. 4A illustrates a non-return-to-zero data stream bit representing a '1' being mixed with an early and a late pulse from a pulse generator according to one embodiment of the present invention;

FIG. 4B illustrates a non-return-to-zero data stream bit representing a '0' being mixed with an early and a late pulse from a pulse generator according to one embodiment of the present invention;

FIG. 5A illustrates a single wavelet encoded with a '1' generated by the circuit FIG. 4A;

FIG. 5B illustrates a single wavelet encoded with a '0' generated by the circuit FIG. 4B;

FIG. 7B is an illustration of the early and late pulses generated by the pulse generating circuit of FIG. 6;

FIG. 7C illustrates a bi-phase wavelet generated by the pulse generating circuit of FIG. 6 when the incoming data bit is high;

FIG. 7D illustrates a bi-phase wavelet generated by the pulse generating circuit of FIG. 6 when the incoming data bit is low;

FIG. 7E is a schematic diagram of a FET bridge differential mixer;

FIG. 7F is a schematic diagram of a diode bridge differential mixer;

FIG. 9A illustrates a single wavelet encoded with a '1' generated by the circuit FIG. 8A;

FIG. 9B illustrates a single wavelet encoded with a '0' generated by the circuit FIG. 8B;

FIG. 10 illustrates a circuit for creating a constellation of shapes of UWB wavelets according to one embodiment of the present invention;

FIG. 10A illustrates a circuit for creating a constellation of shapes of UWB wavelets using a look-up table and D/A converters according to one embodiment of the present invention;

FIG. 15 is a schematic of an exemplary digital to analog device for adding amplitude to a waveform according to one embodiment of the present invention;

DESCRIPTION OF THE PREFERRED EMBODIMENTS

Figure 1A:
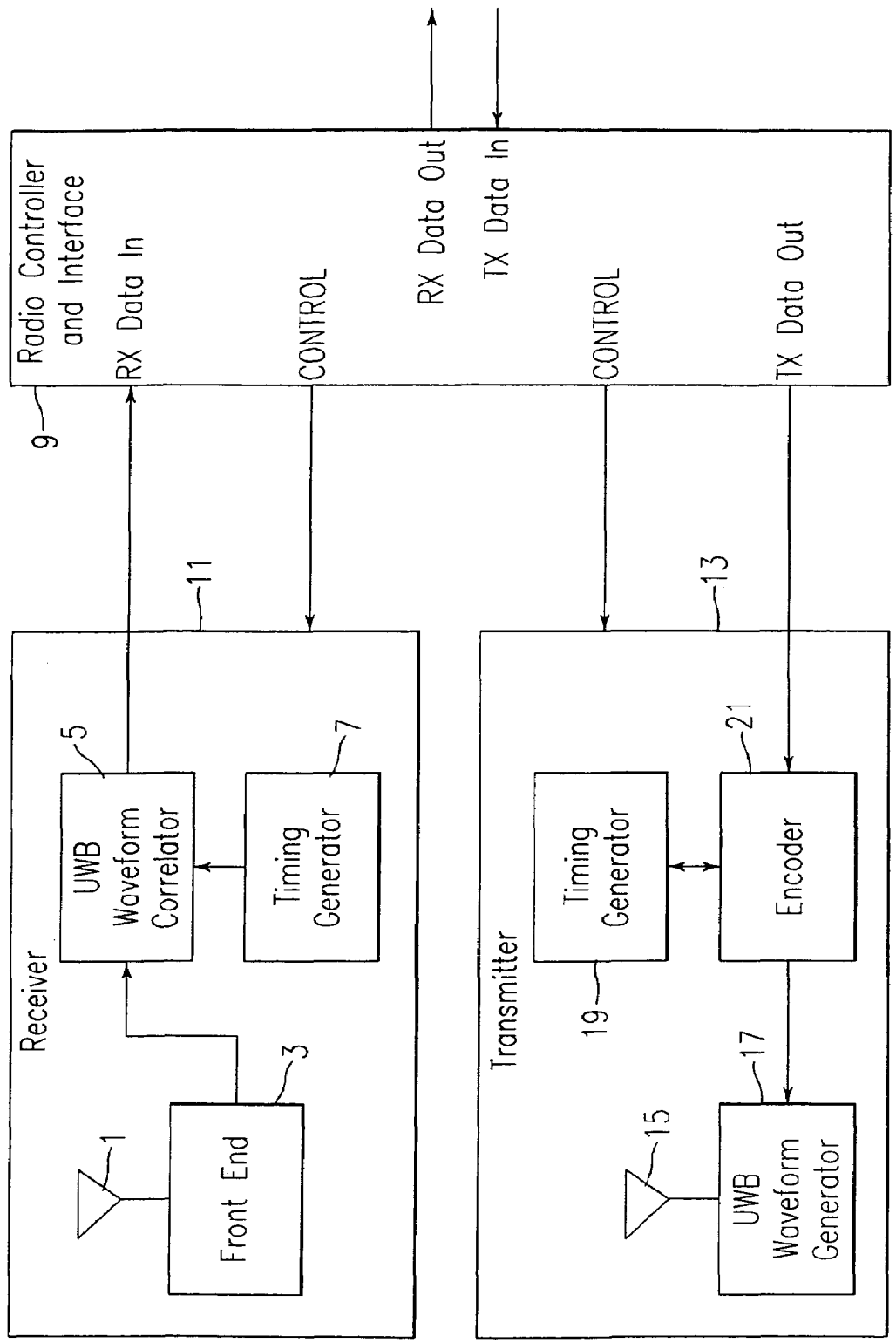
FIG. 1a is a block diagram of an ultra-wide band (UWB) transceiver, according to the present invention.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, ..., +aN, −aN), (iii) quadrature phase signals (+1, −1, +j, −j), (iv) multi-phase signals (1, −1, exp(+jπ/N), exp(−jπ/N), exp(+jπ/N), exp(−jπ/N), ..., exp(+j(N−1)/N), exp(−jπ(N−1)/N)), (v) multilevel multi-phase signals ($a_i \exp(j2\pi\beta/N)| a_i \epsilon \{1, a1, a2, ..., aK\}, \beta \epsilon \{0, 1, ..., N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \epsilon \{1, ..., M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermine a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $$g_{B_i}(t - T_i).$$

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \quad (2)$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_i \angle \theta_i$, where $a_i$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \quad (3)$$

In the above equation, the function $\Psi()$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2} B_{i,3} B_{i,4}} = f_{\omega_i, k_i, b_i}(t) = e^{-[b_i t]^2} \sin(\omega_i t + k_i t^2). \quad (4)$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left\{ \frac{1}{e^{\frac{-(t-t1_i)}{3 \cdot t_{r_i}}} + 1} - \frac{1}{e^{\frac{-(t-t2_i)}{3 \cdot t_{f_i}}} + 1} \right\} \cdot \sin(\theta_i + \omega_i t + k_i t^2) \quad (5)$$

where $\{B_{i,2}, B_{i,3}, B_{i,4}, B_{i,5}, B_{i,6}, B_{i,7}, B_{i,8}\} = \{t_{1_i}, t_{2_i}, t_{r_i}, t_{f_i}, \theta_i, \omega_i, k_i\}$ In the above equation, the leading edge turn on time is controlled by $t_1$, and the turn-on rate is controlled by $t_r$. The trailing edge turn-off time is controlled by $t_2$, and the turn-off rate is controlled by $t_f$. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega=1$, $t_r=t_f=0.25$, $t_1=t_r/0.51$, and $t_2=T_D-t_r/9$.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25 f_c$ and toward $2f_c$. A key attribute of the exemplary wavelets (or e.g., those described in U.S. Pat. No. 6,700,939) is that the parameters are chosen such that neither f nor h in Equation 2 above has a DC component, yet f and h exhibit the required wide relative bandwidth for UWB systems.

Similarly, as a result of $B > 0.25 f_c$, it should be noted that the matched filter output of the UWB signal is typically only a few cycles, or even a single cycle. For example, the parameter n in Equation Error! Reference source not found. above may only take on low values (e.g., such as those described in U.S. Pat. No. 6,700,939).

Figure 1B:
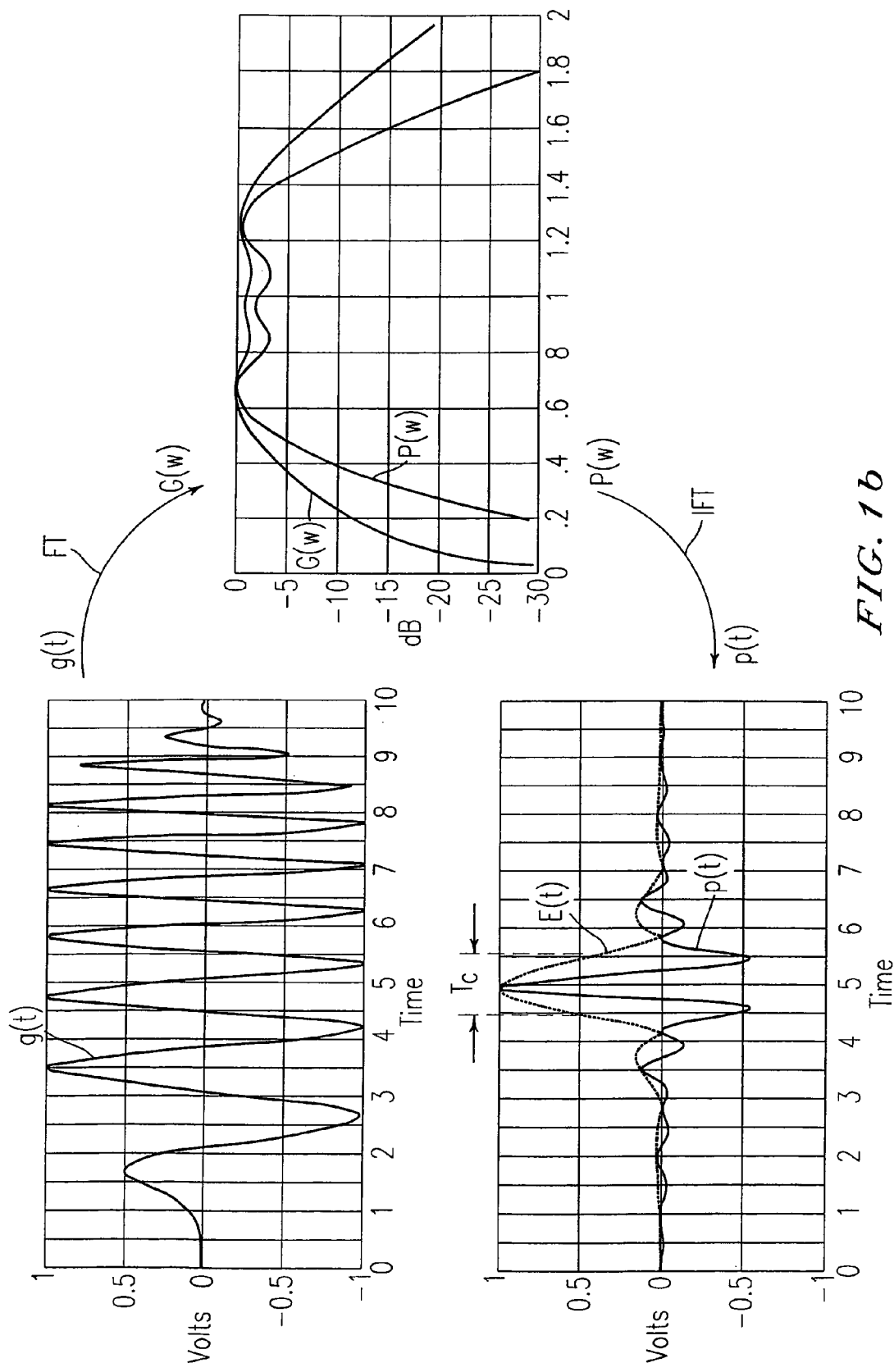
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by $G(\omega)$. Accordingly, the matched filter is represented as $G^*(\omega)$, the complex conjugate, so that the output of the matched filter is $P(\omega) = G(\omega) \cdot G^*(\omega)$. The output of the matched filter in the time domain is seen by performing an inverse Fourier transform (IFT) on $P(\omega)$ so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t) = \sqrt{(p(t))^2 + (p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICS) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
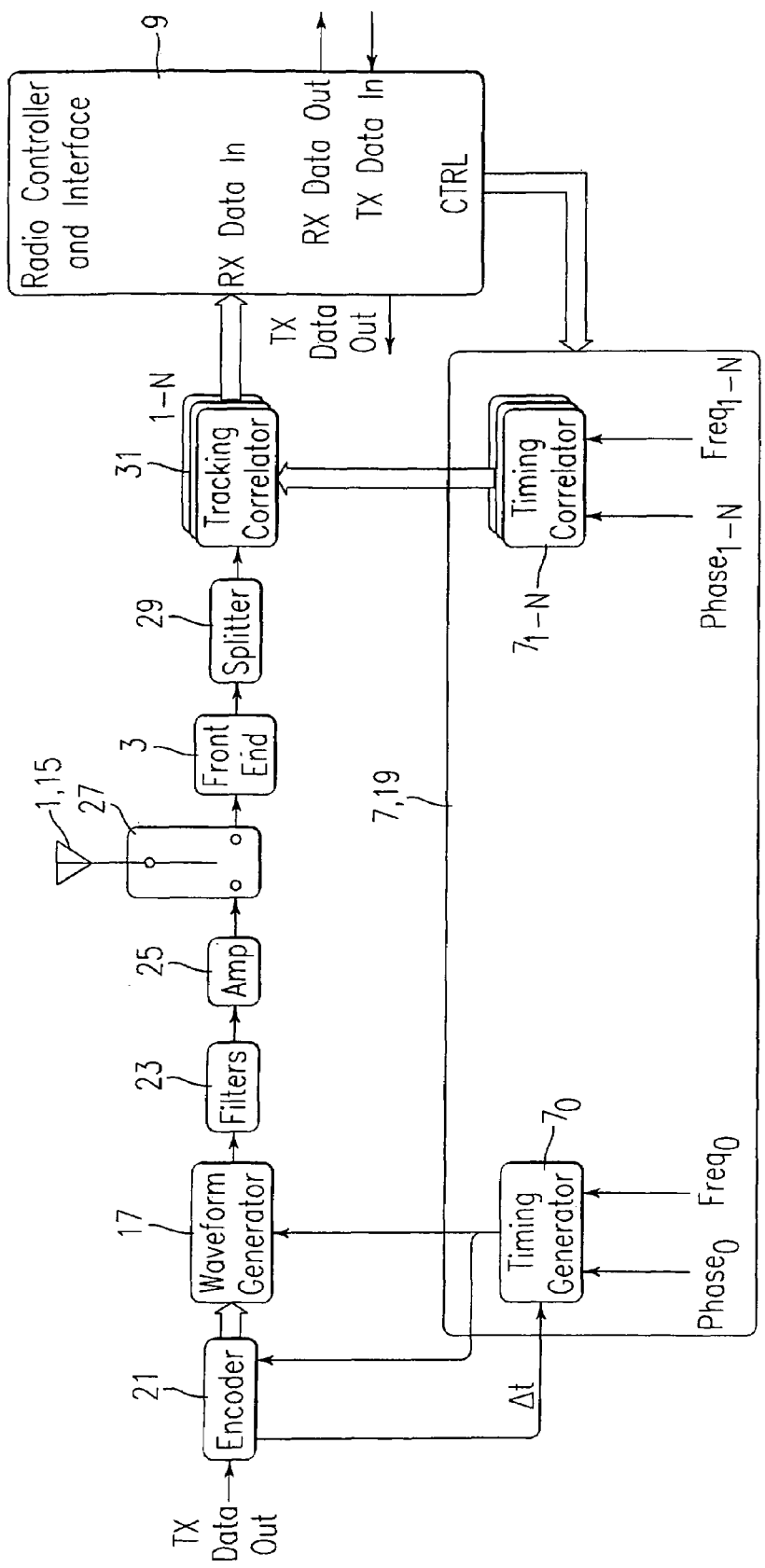
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 2.

The timing generators $7_1$–$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., Δt) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

The UWB transceiver of FIG. 1a or 2 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1a or 2 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 3:
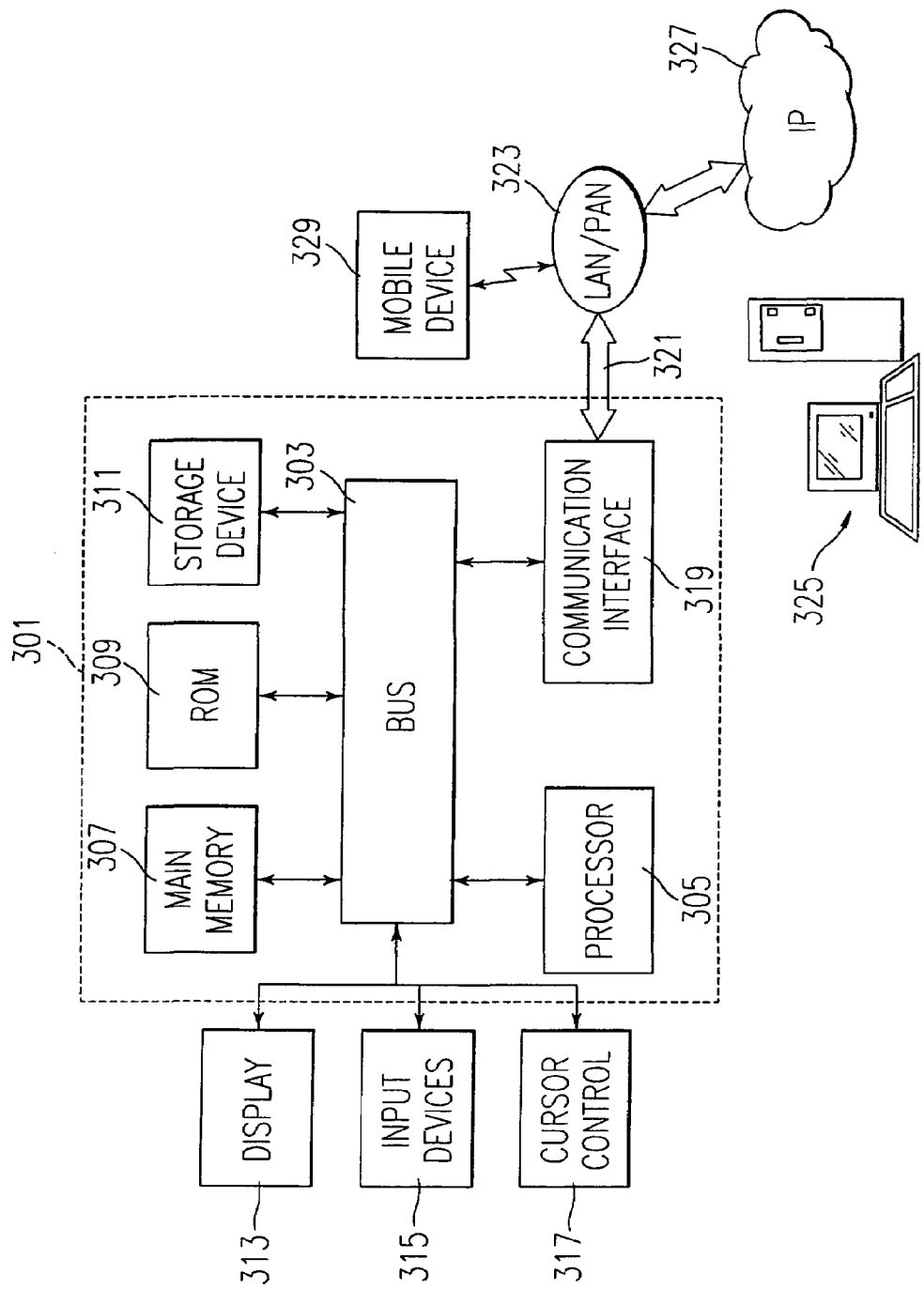
FIG. 3 is a schematic diagram of a general-purpose microprocessor-based or digital signal processor-based system, which can be programmed according to the teachings of the present invention.

FIG. 3 illustrates a processor system 301 upon which an embodiment according to the present invention may be implemented. The system 301 includes a bus 303 or other communication mechanism for communicating information, and a processor 305 coupled with the bus 303 for processing the information. The processor system 301 also includes a main memory 307, such as a random access memory (RAM) or other dynamic storage device (e.g., dynamic RAM (DRAM), static RAM (SRAM), synchronous DRAM (SDRAM), flash RAM), coupled to the bus 303 for storing information and instructions to be executed by the processor 305. In addition, a main memory 307 may be used for storing temporary variables or other intermediate information during execution of instructions to be executed by the processor 305. The system 301 further includes a read only memory (ROM) 309 or other static storage device (e.g., programmable ROM (PROM), erasable PROM (EPROM), and electrically erasable PROM (EEPROM)) coupled to the bus 303 for storing static information and instructions for the processor 305. A storage device 311, such as a magnetic disk or optical disc, is provided and coupled to the bus 303 for storing information and instructions.

The processor system 301 may also include special purpose logic devices (e.g., application specific integrated circuits (ASICs)) or configurable logic devices (e.g, simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 301 may additionally include a compact disc reader, a compact disc reader-writer unit, or a compact disc juke box, each of which may be connected to the same device bus or another device bus.

The processor system 301 may be coupled via the bus 303 to a display 313, such as a cathode ray tube (CRT) or liquid crystal display (LCD) or the like, for displaying information to a system user. The display 313 may be controlled by a display or graphics card. The processor system 301 includes input devices, such as a keyboard or keypad 315 and a cursor control 317, for communicating information and command selections to the processor 305. The cursor control 317, for example, is a mouse, a trackball, or cursor direction keys for communicating direction information and command selections to the processor 305 and for controlling cursor movement on the display 313. In addition, a printer may provide printed listings of the data structures or any other data stored and/or generated by the processor system 301.

The processor system 301 performs a portion or all of the processing steps of the invention in response to the processor 305 executing one or more sequences of one or more instructions contained in a memory, such as the main memory 307. Such instructions may be read into the main memory 307 from another computer-readable medium, such as a storage device 311. One or more processors in a multi-processing arrangement may also be employed to execute the sequences of instructions contained in the main memory 307. In alternative embodiments, hard-wired circuitry may be used in place of or in combination with software instructions. Thus, embodiments are not limited to any specific combination of hardware circuitry and software.

As stated above, the processor system 301 includes at least one computer readable medium or memory programmed according to the teachings of the invention and for containing data structures, tables, records, or other data described herein. Stored on any one or on a combination of computer readable media, the present invention includes software for controlling the system 301, for driving a device or devices for implementing the invention, and for enabling the system 301 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 305 for execution. A computer readable medium may take many forms, including but not limited to, non-volatile media, volatile media, and transmission media. Non-volatile media includes, for example, optical, magnetic disks, and magneto-optical disks, such as the storage device 311. Volatile media includes dynamic memory, such as the main memory 307. Transmission media includes coaxial cables, copper wire and fiber optics, including the wires that comprise the bus 303. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 305 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 301 may receive the data on the telephone line and use an infrared transmitter to convert the data to an infrared signal. An infrared detector coupled to the bus 303 can receive the data carried in the infrared signal and place the data on the bus 303. The bus 303 carries the data to the main memory 307, from which the processor 305 retrieves and executes the instructions. The instructions received by the main memory 307 may optionally be stored on a storage device 311 either before or after execution by the processor 305.

The processor system 301 also includes a communication interface 319 coupled to the bus 303. The communications interface 319 provides a two-way UWB data communication coupling to a network link 321 that is connected to a communications network 323 such as a local network (LAN) or personal area network (PAN)323. For example, the communication interface 319 may be a network interface card to attach to any packet switched UWB-enabled personal area network (PAN)323. As another example, the communication interface 319 may be a UWB accessible asymmetrical digital subscriber line (ADSL) card, an integrated services digital network (ISDN) card, or a modem to provide a data communication connection to a corresponding type of communications line. The communications interface 319 may also include the hardware to provide a two-way wireless communications coupling other than a UWB coupling, or a hardwired coupling to the network link 321. Thus, the communications interface 319 may incorporate the UWB transceiver of FIG. 2 as part of a universal interface that includes hardwired and non-UWB wireless communications coupling to the network link 321.

The network link 321 typically provides data communication through one or more networks to other data devices. For example, the network link 321 may provide a connection through a LAN to a host computer 325 or to data equipment operated by a service provider, which provides data communication services through an IP (Internet Protocol) network 327. Moreover, the network link 321 may provide a connection through a PAN 323 to a mobile device 329 such as a personal digital assistant (PDA) laptop computer, or cellular telephone. The LAN/PAN communications network 323 and IP network 327 both use electrical, electromagnetic or optical signals that carry digital data streams. The signals through the various networks and the signals on the network link 321 and through the communication interface 319, which carry the digital data to and from the system 301, are exemplary forms of carrier waves transporting the information. The processor system 301 can transmit notifications and receive data, including program code, through the network(s), the network link 321 and the communication interface 319.

The encoder 21 and waveform generator 17 of the transceiver of the present invention function together to create a UWB waveform from a digital data stream by first multiplying each bit of data in the data stream by an identifying code (e.g., an n-bit user code), thereby expanding each bit of data into a codeword of data bits equal in length to the length of the identifying code. In one embodiment, the codeword is then further processed to create two derivative codewords that are that are sent to the UWB waveform generator 17 where they are mixed with a pulse generator and recombined through a two-stage mixing process prior to being transmitted via the antenna 15.

As stated above, the encoder 21 receives a digital data stream from an external source via the radio and controller interface 9. The encoder 21 multiplies each bit of the digital data stream by a user code, which in one embodiment is a unique sequence of bits corresponding to a particular user. For example, multiplying a user code of '1101 0110' by a data bit of '1' results in an 8-chip representation of the '1' that is identical to the user code, or '1101 0110.' On the other hand, multiplying that same user code by a data bit of '0' results in an 8-bit representation of the '0' that is the 8 chip user code inverted, or '0010 1001.'

Continuing with the above example, the encoder 21 multiplies the user code by each bit of the digital data stream to create a sequence of n-chip codewords, where n is the length of the user code. Once the digital data stream has been encoded, the UWB waveform generator 17 further processes the sequence of codewords in creating an UWB waveform that can be transmitted.

FIGS. 4A and 4B illustrate an exemplary circuit using a differential mixer 401 for generating UWB wavelets encoded with data according to one embodiment of the present invention. As shown in FIGS. 4A and 4B, a binary non-return-to-zero (NRZ) data source is connected to an input of a differential mixer 400. Connected to the two differential inputs of the LO port 407, 408 of the differential mixer 401 are two outputs of a pulse generator that generates a pair of pulse streams configured to apply an early pulse 403 at the first differential input 407 and immediately thereafter, a late pulse 404 at the second differential input 408 of the LO port. The wavelet generator is configured such that the NRZ data source is at a rate such that each bit of data will be as long or longer than the combined duration of an early pulse and a late pulse generated by the pulse generator. Accordingly, each bit of NRZ data will be mixed with both the early pulse 403 and the late pulse 404.

FIG. 4A illustrates the example where the incoming bit from the NRZ data source is a '1' (i.e., positive voltage), whereas FIG. 4B illustrates the example where the incoming data bit is a '0' (i.e., negative voltage). The output of the differential mixer 402 for both examples is a UWB wavelet that occupies the same time frame and has the data encoded in the shape of the wavelet, not in the time position of the wavelet.

FIGS. 5A and 5B illustrate the shapes of the UWB wavelets produced by the differential mixer 401 in the two examples described in FIGS. 4A and 4B respectively. As shown in FIG. 5A, a UWB wavelet 500 is produced by mixing a NRZ data '1' with the early pulse input to the first differential input of the mixer 407 and the late pulse input to the second differential input of the mixer 408 as illustrated by FIG. 4A. As will be described below, the early and late pulses generated by a pulse generator cause the mixer to produce a 'high' then 'low' output that, when mixed with a NRZ data '1,' will produce the wavelet shown in FIG. 5A. As would be well understood by one of ordinary skill in the communications art, the shape of the resultant UWB wavelet is such that the integral of the wavelet is 0.

FIG. 5B illustrates a UWB wavelet 501 produced by mixing a NRZ data '0' (e.g., a negative voltage) with the early pulse input to the first differential input of the mixer 407 and the late pulse input to the second differential input of the mixer 408 as illustrated by FIG. 4B. As shown in FIGS. 5A and 5B, the two different UWB wavelets are inverted representations of one another. By encoding the data (i.e., the '0' and the '1') onto the shape of the UWB wavelet, the single bit of information may be encoded as one of the two shapes corresponding to a '0' or a '1' accordingly. Comparing this novel UWB modulation technique with that of a conventional PPM UWB systems, it can be seen that by using this technique, a bit of information may be transmitted in the time taken to transmit a single wavelet (i.e., a '1' being a positive then negative wavelet and a '0' being a negative then positive wavelet), as compared to the necessarily longer time required to transmit a time-positioned encoded bit of information (i.e., a '1' being represented by a wavelet occurring early in a larger time window, and a '0' being represented by a wavelet occurring late in a larger time window).

Figure 6:
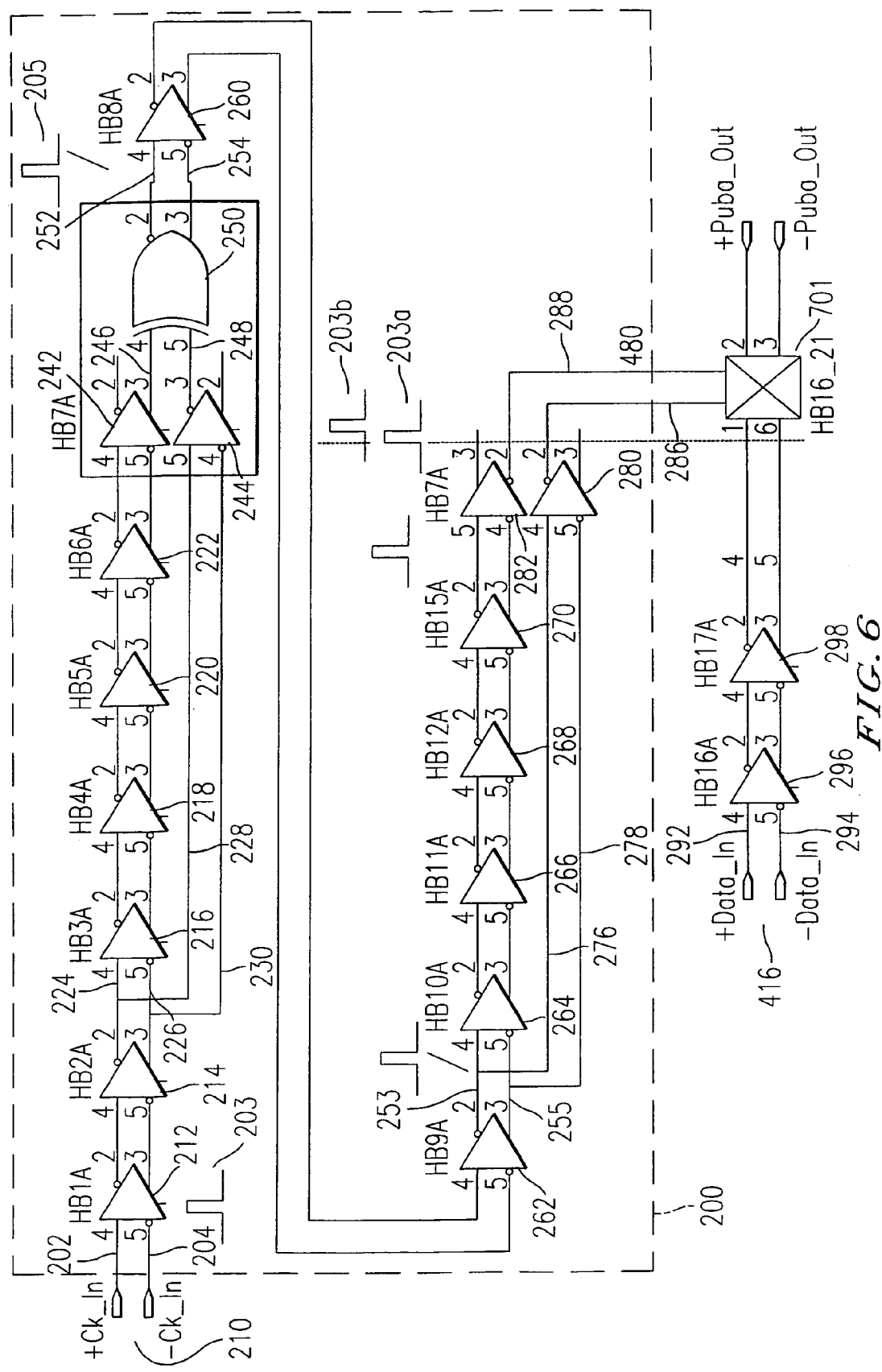
FIG. 6 is a schematic diagram of a circuit used to generate an early pulse and a late pulse according to one embodiment of the present invention.

FIG. 6 is a schematic diagram of a circuit for generating a UWB waveform in one embodiment of the present invention. As shown in FIG. 6, data 416 is mixed at a first mixer 701 with the outputs of an early/late pulse generator 200. The early/late pulse streams run at the chipping rate. The chipping rate can be the same as the data rate of derived input data 416, in which case a single wavelet, or chip, is transmitted for each bit. The chipping rate may also be an integer multiple of the data rate of the derived input data 416. In such a case, each bit is made up of a predetermined number of bits. For example, if the data stream 416 is at 50 Mb/s and there are 16 chips per bit, then the early/late pulse streams 286, 288 are at 800 MHz.

Figures 6A, 7A:
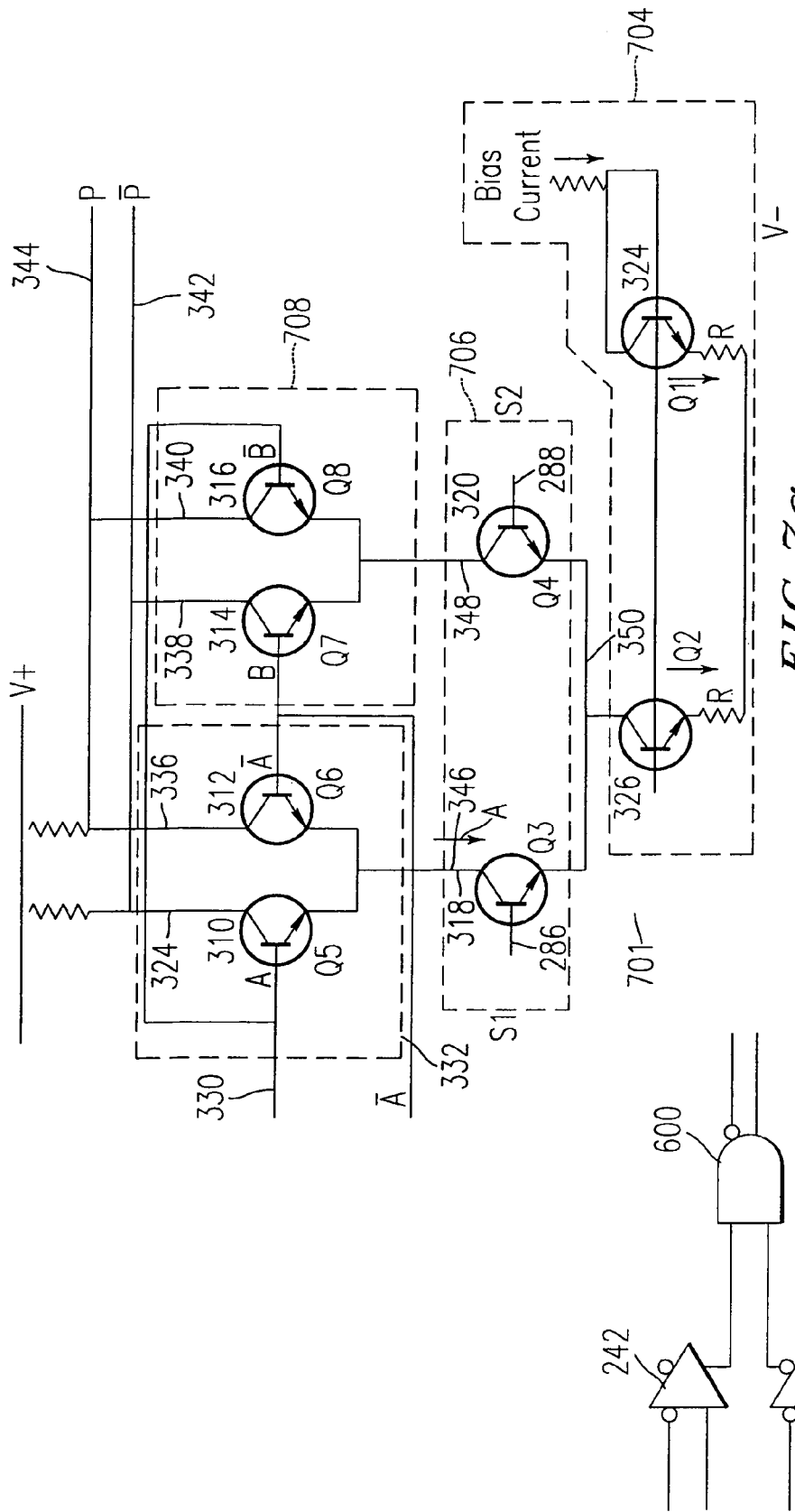
FIG. 6A is a schematic diagram of an AND gate used in the circuit of FIG. 6 according to one embodiment of the present invention.
FIG. 7A is a schematic diagram of a Gilbert cell differential mixer.

As shown in FIG. 6, the pulse generator 200 receives its input from a differential clock 210 which generates a pulse 203, which is differentially transmitted on lines 202 and 204. Input lines 202, 204 feed into the first of a set of seven buffers 212, 214, 216, 218, 220, 222, and 224 connected in series. While seven buffers are shown in this first series-connected set of buffers, it would be understood by one of ordinary skill in the art that other numbers of buffers could be used to provide a different time delay through the set. Buffers 214 and 216 are connected in series via lines 224, 226. In the preferred embodiment disclosed in FIG. 6, data lines 228 and 230 branch off from lines 224 and 226 respectively and serve as inputs to buffer 244. The output of buffers 242 and 244 serve as inputs via lines 246, 248 to an exclusive OR gate 250, which generates a pulse 205. In another embodiment, an AND gate could be used in place of the exclusive OR gate 250, where the inverting output of one of either buffer 242 or buffer 244 is used to feed the AND gate 600 instead of the non-inverting output, as shown in FIG. 6A. An AND gate 600 provides some advantages since the AND gate 600 generates a pulse only on the rise of the pulse, whereas an exclusive OR gate 250 gives a pulse both on the rise and the fall of the pulse. Therefore, timing of the circuit is less difficult to implement with an AND gate. The output of the exclusive OR gate 250 is a differential pulse 205 which feeds into another series-connected set of buffers, in this example, seven buffers 260, 262, 264, 266, 268, 270, and 282 via lines 252, 254. Buffers 262 and 264 are connected in series via lines 253 and 255. In the preferred embodiment disclosed in FIG. 6, data lines 276 and 278 branch off from lines 253 and 255 respectively and serve as inputs to buffer 280. The output from buffers 280 and 282 feed into differential mixer 701 via lines 286 and 288. The differential mixer 701 receives the data stream from encoder 21 over lines 292, 294.

The function of the pulse generator 200 shown in FIG. 6 will now be described. The clock 210 generates a differential semi-square wave clock signal 203, which are transmitted over lines 202, 204 to buffer 212. Buffer 212 serves to amplify, saturate, and generally square up the incoming signal, and then buffer 214 squares it up some more. The transmission of the clock signal 203 through two paths, one through buffers 216, 218, 220, 222, and 242, and the other through buffer 244, causes the clock signal to reach the output of buffer 244 before it reaches the output of buffer 242. In other words, the output of buffer 244 leads the output of buffer 242 by the delay accumulated in buffers 216, 218, 220, and 222. Since the inputs to the exclusive OR gate 250 are matched except at the clock transitions, pulse 205 is generated at the output of exclusive OR gate 250 at each transition of the clock. The pulse stream, therefore, is at twice the clock frequency because an exclusive OR gate 250 generates a pulse on both leading and trailing clock transitions.

In another embodiment, an AND gate 600 could be used in place of the exclusive OR gate 250, where the inverting output of either buffer 242 or buffer 244 is used to feed the AND gate 600 instead of the non-inverting output, as shown in FIG. 6A. Since the inputs to the AND gate 600 are mismatched except at the leading clock edge transition (if the inverting output of buffer 242 is used), or the trailing clock edge transition (if the inverting output of buffer 244 is used) the output of the AND gate 600 is a pulse stream that equals the clock frequency. An AND gate 600 provides some advantages since the AND gate 600 generates a pulse only on the rise or fall of the pulse, whereas an exclusive OR gate 250 gives a pulse both on the rise and the fall of the pulse. Therefore, the duty-cycle of the clock does not have to be exactly 50% in order to have an equal time period between all pulses. Instead, the duty cycle can be anything, making the circuit is less difficult to implement.

The pulse 205 is transmitted over differential lines 252 and 254 to buffer 260. Buffer 260 serves to amplify, saturate, and generally square up the pulse and then buffer 262 squares it up some more. The transmission of the pulse 205 through two paths, one path via differential lines 253 and 255 through buffers 264, 266, 268, 270, and 282, and the other path via differential lines 246 and 248 through buffer 280 causes the pulse 205 to reach the output of buffer 280 before it reaches the output of buffer 282. In other words, output 286 of buffer 280 leads output 288 of buffer 282 by the delay accumulated in buffers 264, 266, 268, and 270. Accordingly, line 286 has an early pulse and line 288 has a late pulse, making pulse streams 203a and 203b respectively.

The early pulse on line 286 feeds the non-inverting differential LO input of multiplier 701. The late pulse on line 288 feeds the inverting differential LO input of multiplier 701. The differential data-source 416 generates data, which is differentially transmitted on lines 292 and 294. Input lines 292 and 294 feed into the first of a set of two series-connected buffers 296 and 298. The differential output data from buffer 298 drives the differential RF-input port of multiplier 701. Given the data on the RF-port of multiplier 701, and the early and late pulse on the non-inverting and inverting input lines of the differential LO-port of multiplier 701, the output of the multiplier is the desired wavelet shape. When the data is a '1,' the output wavelet has a ground-positive-negative-ground shape, and when the data is a '0,' the output wavelet has a ground-negative-positive-ground shape.

FIG. 7A is a schematic diagram of a transistor-based Gilbert cell differential mixer used in one embodiment of the present invention. In this embodiment, it is shown that mixing the resultant early/late pulse streams 286, 288 generated by the pulse generator 200 shown in FIG. 6, the result is a sequence of bi-phase wavelets corresponding to the input data 416. In other embodiments of the present invention, the wavelets generated may have different shapes, such as, but not limited to multilevel and/or quad-phase wavelets. Accordingly, if different encoding schemes are used, different amounts of information may be encoded in any single wavelet, thereby affecting the data rates achievable at a given chip rate.

As would be understood by one of ordinary skill in the art, FIG. 7A is a schematic diagram of a bipolar transistor-based Gilbert cell differential multiplier. It is capable of multiplying the differential signal across 330 and 332, by the differential signal across 286 and 288, the product appearing across the differential output 340 and 342. It includes a current mirror 704, which provides a current that will be steered between the differential output nodes 340 and 342. Differential pair 706 steers the current between two paths, the first path to differential pair 710, and the second path to differential pair 708. Differential pair 710 and differential pair 708 are connected to differential input lines 330 and 332, and to the differential output nodes 340 and 342 so as to oppose one another, (i.e., if the differential input 330 is high, then differential pair 710 steers its current to pull 342 low but differential pair 708 steers its current to pull 342 high). The pair that dominates is determined by which has the most current available to it, which is determined by differential pair 706. Differential pair 706 accepts differential inputs 286 and 288. When 286 is higher than 288, the current is steered to differential pair 710 and the output 340 is inverted from input 330 (i.e., multiplying by −1). When 288 is higher than 286, the current is steered to differential pair 708 and the output 340 is not inverted from input 330 (i.e., multiplying by +1). When 286 is equal to 288, the current is steered identically to the output nodes 340 and 342 so that the output is independent of the input 330 and 332 (i.e., multiplying by zero). Accordingly, by mixing the early/late pulses shown in FIG. 7B with a high input to A 330, the output waveform will be of the form shown in FIG. 7C. On the other hand, by mixing the early/late pulses shown in FIG. 7B with a low input to A 330, the output waveform will be of the form shown in FIG. 7D.

In other embodiments, the wavelet generating function of the differential mixer 701 is accomplished using, for example, bridge circuits using switches. The can be electronically controlled switches such as an FET-bridge mixer 702 of FIG. 7E or a diode-bridge mixer 703 of FIG. 7F. In other embodiments, the switches are mechanical, using, for example, MEM (micro electromechanical machine) technology, or optically driven switches such as a bulk semiconductor material. In various embodiments of the present invention, all of the ports of the mixer are differential or all of the ports of the mixer accept digital inputs, or both.

Using a differential mixer to generate the UWB wavelets according to the present invention provides advantages over conventional methods. For example, using a conventional method of passing a pulse through one or more transmission line stubs to create a waveform includes using components (i.e., the stubs) that are not integratable. Accordingly, the conventional approach uses up more space, which is of a premium when designing UWB wireless devices. Accordingly, by using highly integratable components, such as transistor-based differential components in combination with the pulse generator 200 described above, the present invention provides a highly integratable solution for creating UWB wavelets, even into the microwave regime.

Figure 8A:
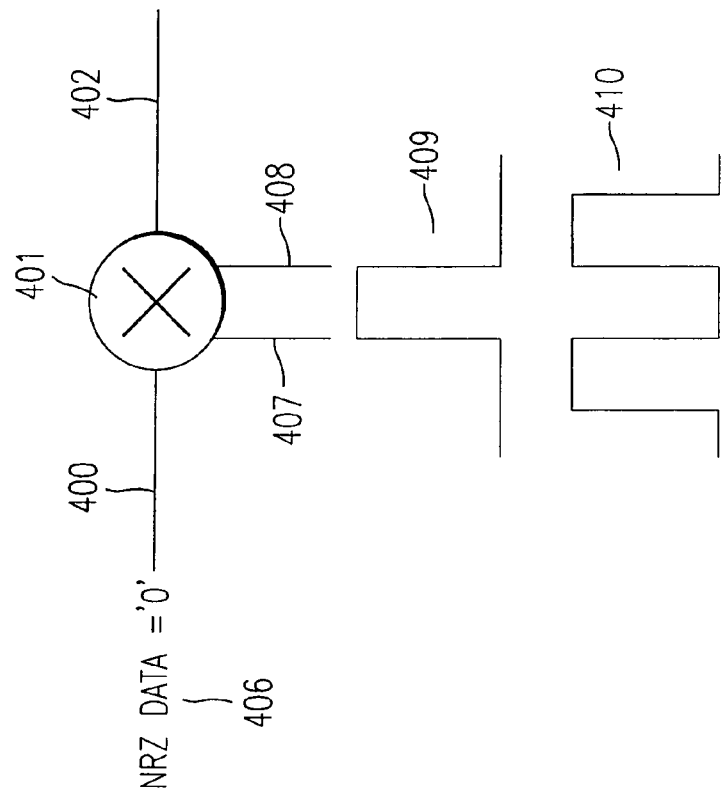
FIG. 8A illustrates a non-return-to-zero data stream bit representing a '1' being mixed with a mid pulse from a pulse generator on a first input of a differential port of a mixer and an early and a late pulse from the pulse generator on a second input of a differential port of a mixer according to one embodiment of the present invention.
Figure 8B:
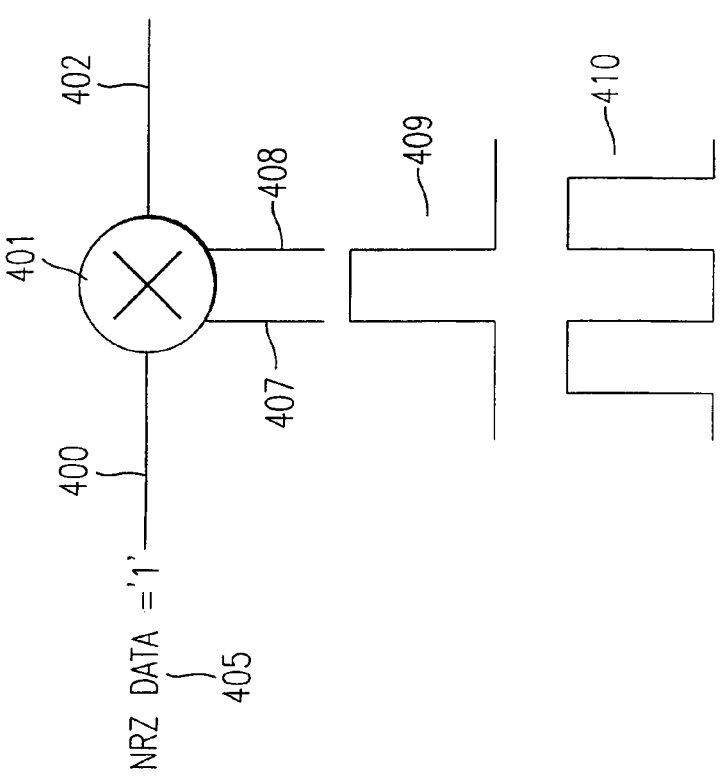
FIG. 8B illustrates a non-return-to-zero data stream bit representing a '0' being mixed with a mid pulse from a pulse generator on a first input of a differential port of a mixer and an early and a late pulse from the pulse generator on a second input of a differential port of a mixer according to one embodiment of the present invention.

FIGS. 8A and 8B illustrate an exemplary circuit for using a mixer 401 to generate UWB wavelets encoded with data according to another embodiment of the present invention. As shown in FIGS. 8A and 8B, a binary NRZ data source is connected to an input of a differential mixer 400. Connected to the two differential inputs of the LO port 407, 408 of the differential mixer 401 are two outputs of a pulse generator 200 providing a pair of pulse streams configured to apply an early pulse and a late pulse 410 at the second differential input 408 and a mid-pulse 409, occurring between the early pulse and late pulse, at the first differential input 407 of the LO port. The wavelet generator is configured such that the NRZ data source is at a rate such that each bit of the data will be as long or longer than the combined duration of an early pulse, a mid-pulse, and late pulse generated by the pulse generator. Accordingly, each bit of NRZ data will be mixed with an early pulse, a mid-pule, and a late pulse.

FIG. 8A illustrates the example where the incoming bit from the NRZ data source is a 'one,' whereas FIG. 8B illustrates the example where the incoming data bit is a 'zero.'The output of the differential mixer 402 for both examples is a UWB wavelet that occupies the same time frame and has the data encoded in the shape of the wavelet, not in the time position of the wavelet.

FIGS. 9A and 9B illustrate the shapes of the UWB wavelets produced by the two examples described in FIGS. 8A and 8B respectively. As shown in FIG. 9A, a UWB wavelet 900 is produced by mixing a NRZ data '1' (i.e., a positive voltage) with the early pulse and late pulse 410 input to the second differential input of the mixer 408, and the mid pulse input to the first differential input of the mixer 407 as illustrated by FIG. 8A. In this embodiment, the early and late pulses generated by the pulse generator are at one-half the amplitude of the mid-pulse generated by the pulse generator. Accordingly, the areas of the two negative portions of the waveform 902, 903, as shown in FIG. 9A, are each one-half the area of the positive portion of the waveform 904. Again, as with the positive-negative UWB wavelet described in FIGS. 5A and 5B, the shape of the UWB wavelet is such that the integral of the wavelet is 0.

FIG. 9B illustrates the UWB wavelet 901 produced by mixing a NRZ data '0' (i.e., a negative voltage) with the early pulse and late pulse input to the second differential input of the mixer 408, and the mid pulse input to the first differential input of the mixer 407 as illustrated by FIG. 8B. As shown in FIGS. 9A and 9B, the two different UWB wavelets are inverted representations of one another. As discussed above, by encoding the data onto the shape of the UWB wavelet, a single bit of information may be encoded as one of the two shapes corresponding to a '0' or a '1' accordingly.

FIG. 10 illustrates an exemplary UWB wavelet generator for generating UWB wavelets that encode more than one bit of data. As shown in FIG. 10, the UWB wavelet generator uses two mixers 1003, 1004, and a summer 1005 to encode two bits of NRZ data. In this embodiment, the odd bits 1001 of the NRZ data stream are input to a first differential mixer 1003, and the even bits 1002 of the NRZ data stream are input to a second differential mixer 1004. The first differential mixer 1003 has an early pulse and a late pulse input to the first and second differential inputs of the LO port, respectively, as described above in FIGS. 4A and 4B. The second differential mixer 1004, on the other hand, has an early pulse, a mid pulse, and a late pulse 1007 input to the two differential inputs of the LO port, as described above in FIGS. 8A and 8B. The output of the first differential mixer 1003 and the output of the second differential mixer 1004 are input to the summer 1005. Accordingly, since each of the two inputs to the summer 1005 can be one of two different shapes, as discussed above in FIGS. 5A, 5B, 9A, and 9B, the output of the summer 1005 can take on one of four distinct shapes. The four distinct shapes output by the summer 1005 correspond to the four unique values that can be encoded in the two bits of NRZ data (i.e., '00,' '01,' '10,' and '11').

FIG. 10A illustrates an exemplary UWB wavelet generator for generating UWB wavelets in another embodiment of the present invention. As shown in FIG. 10A, the input data stream is input to a look-up table (LUT) 1014, where the shape of the UWB wavelets is determined. Based on the value in the look-up table 1014 corresponding to the input data stream, the two digital to analog converters (D/A) 1010, 1012 apply amplitude information onto the incoming data. The varying amplitude signals are then mixed with the outputs of the pulse generator at the two mixers 1003, 1004, as discussed in FIG. 10. Using this circuit, the incoming data stream may be encoded into UWB wavelets having a constellation of shapes and magnitudes which correspond to various data values according to the encoding scheme provided by the look-up table 1014 values.

Figure 11:
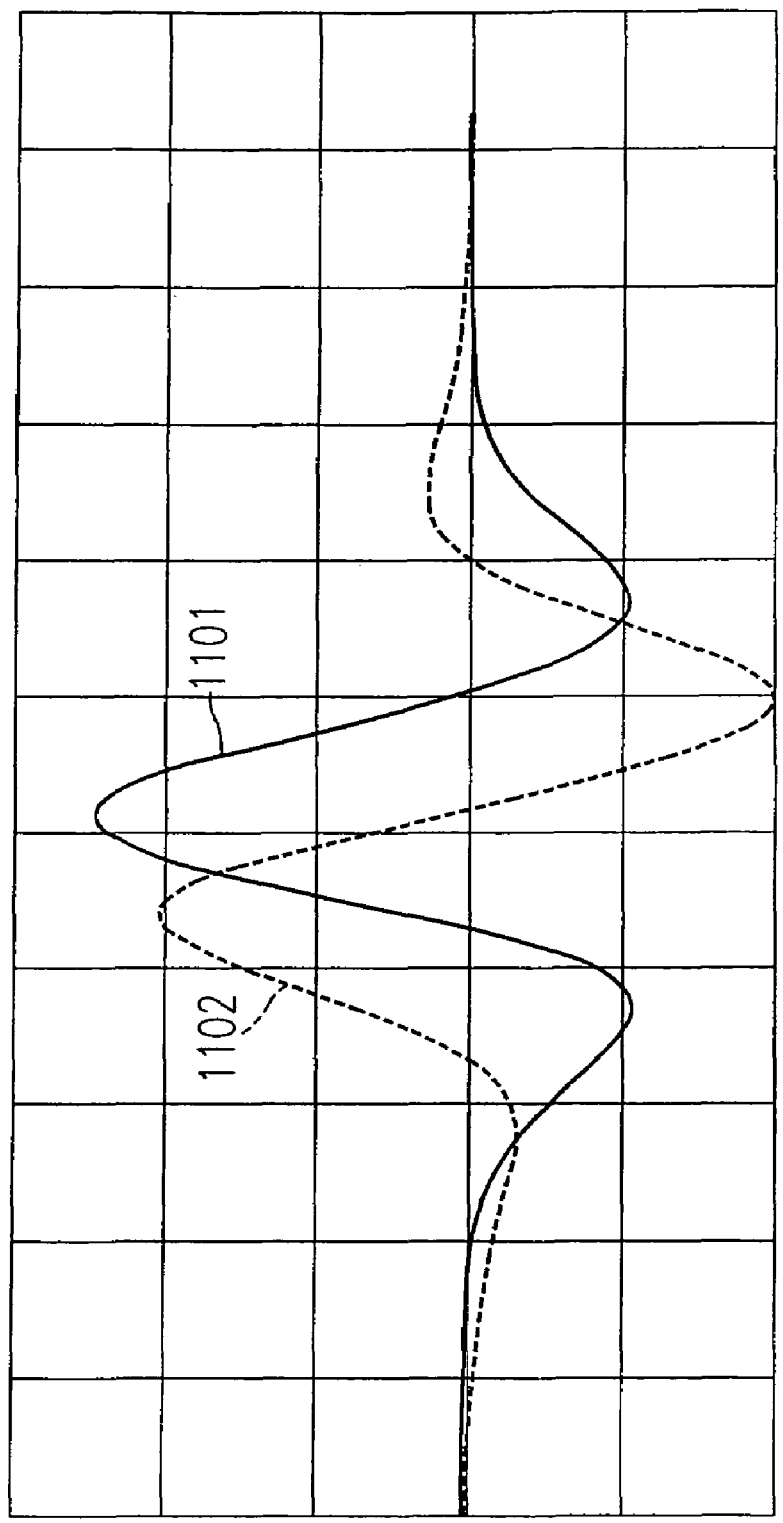
FIG. 11 illustrates two exemplary waveforms that are summed at the summer of FIG. 10 according to one embodiment of the present invention.

FIG. 11 shows the two exemplary intermediate UWB wavelets generated by the circuit of FIG. 10. As shown in FIG. 11, a first wavelet 1102 results from mixing an early pulse and a late pulse 1006 with a NRZ data bit of '1' at mixer 1003. A second UWB wavelet 1101 results from mixing an early pulse, a mid pulse, and a late pulse 1007 with a NRZ data bit of '1' at mixer 1004. Accordingly, the output of the summer 1005 will be the addition of these two UWB wavelets which will create a UWB wavelet that corresponds to a two-bit value of '11.'

Figure 12:
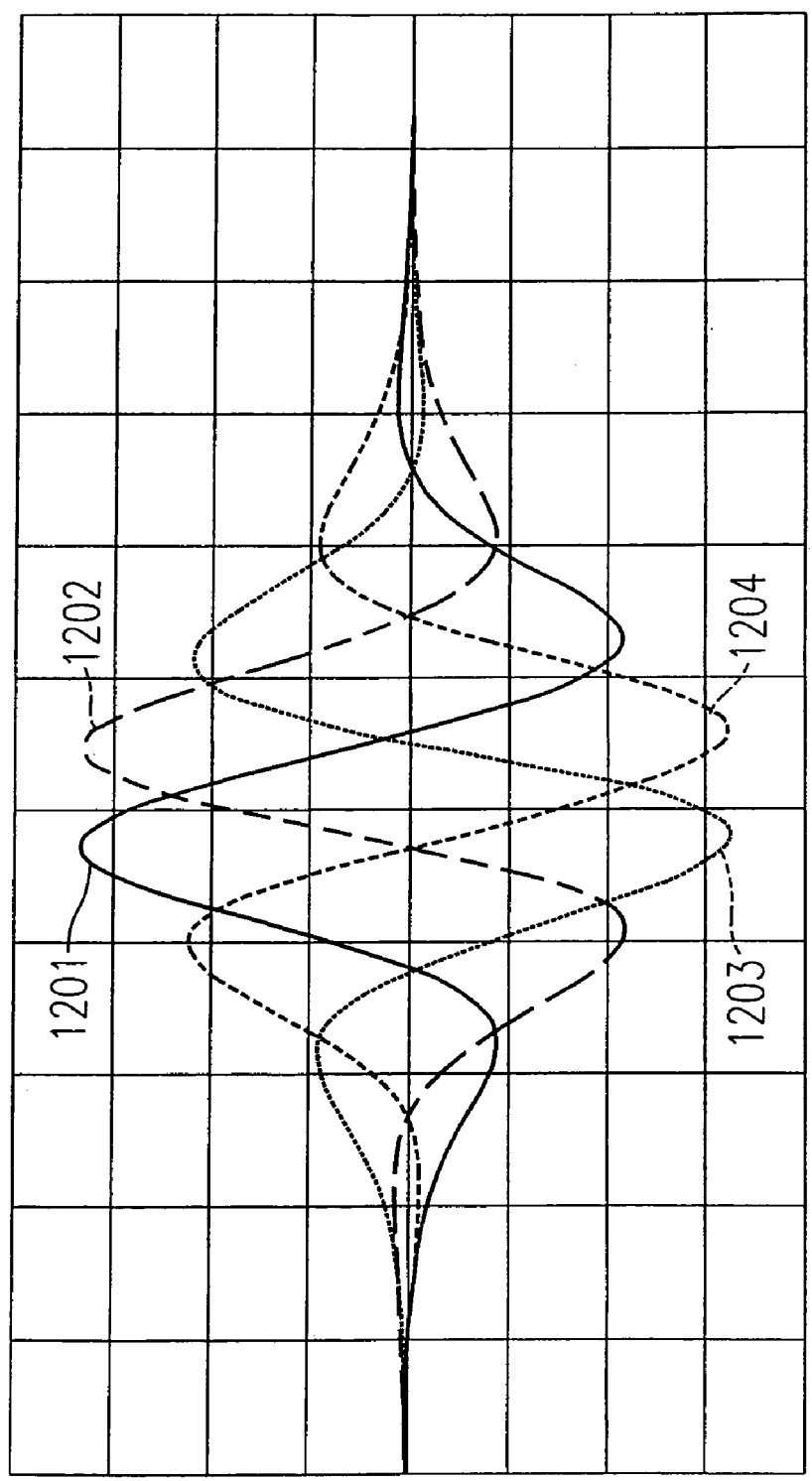
FIG. 12 illustrates an exemplary constellation of UWB wavelet shapes produced by the circuit of FIG. 10 according to one embodiment of the present invention.
Figure 13A:
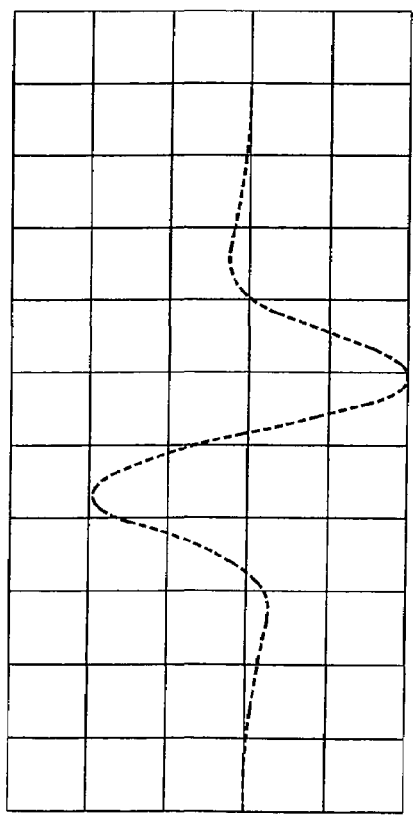
FIGS. 13A–13D illustrate exemplary UWB wavelet shapes wherein data has been further encoded into the amplitude of the wavelets according to one embodiment of the present invention.
Figure 13B:
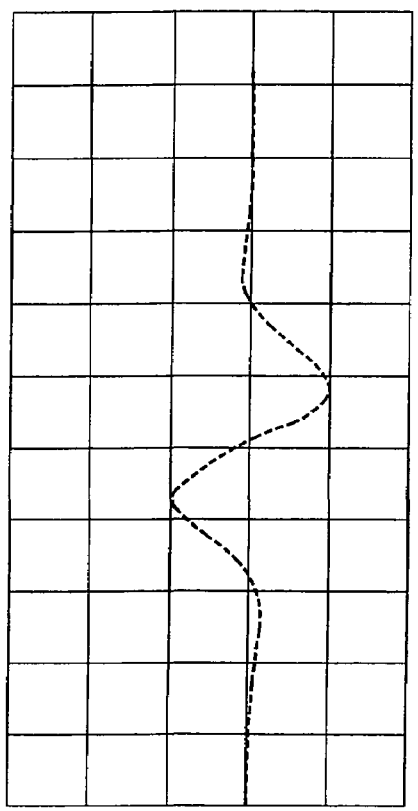
Figure 13C:
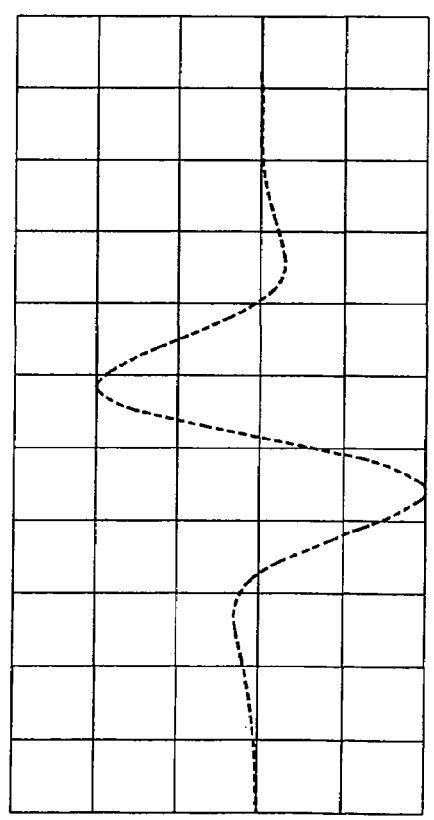
Figure 13D:
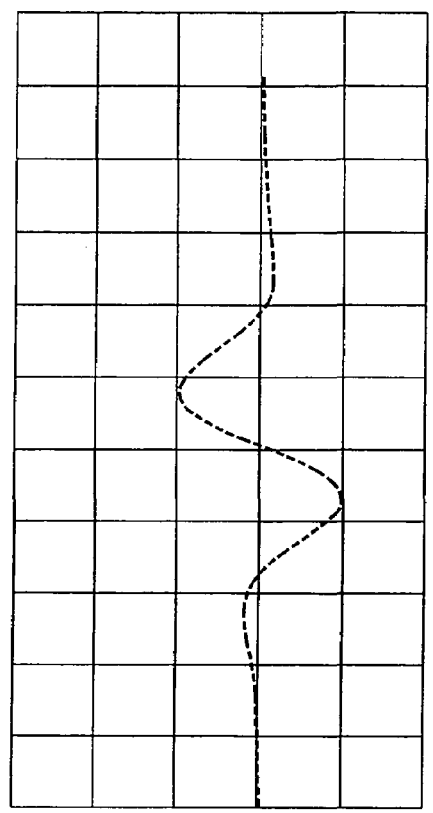
Figure 14A:
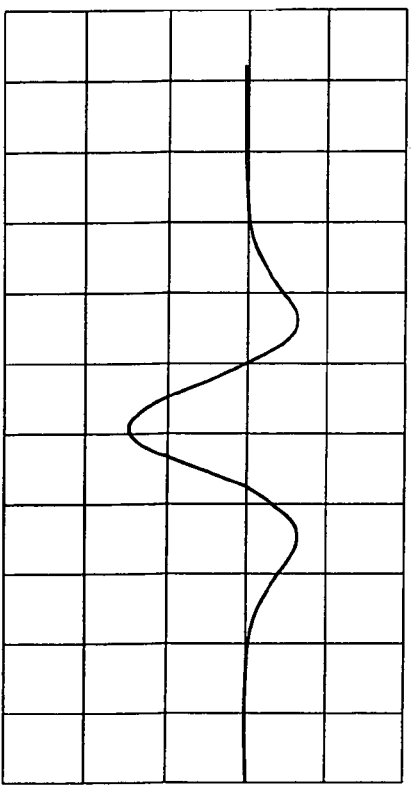
FIGS. 14A–14D illustrate further exemplary UWB wavelet shapes wherein data has been further encoded into the amplitude of the wavelets according to one embodiment of the present invention.
Figure 14B:
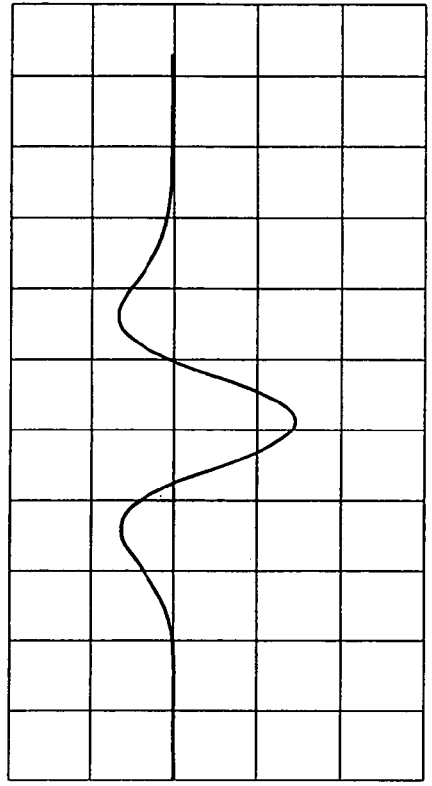
Figure 14C:
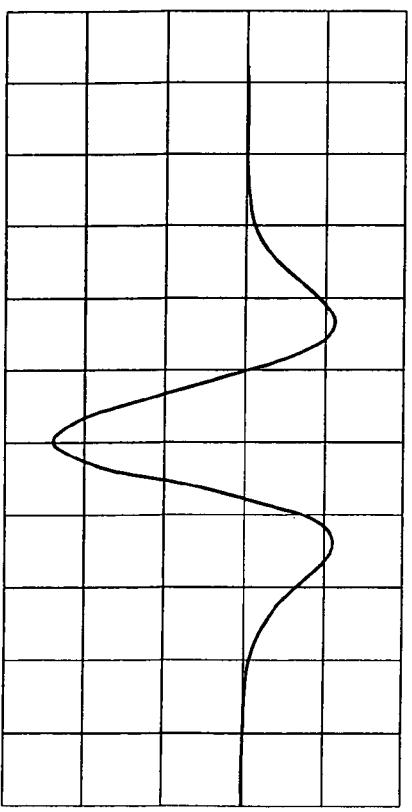
Figure 14D:
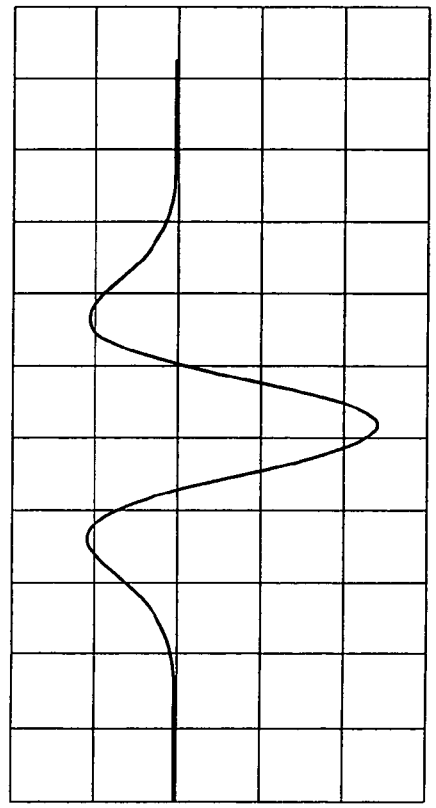

FIG. 12 shows four uniquely-shaped waveforms, all occurring within the same time frame, that correspond, for example, to the four possible values of the two bits encoded in the circuit of FIG. 10. As shown in FIG. 12, a data value of '11' may be represented by the UWB wavelet 1201 resulting from the addition of the two waveforms shown in FIG. 11. The four uniquely-shaped UWB wavelets 1201, 1202, 1203, and 1204 shown in FIG. 12, therefore, correspond to the four potential values of two bits of data (i.e., '00,' '01,' '10,' and '11').

FIGS. 13A–13D and 14A–14D further illustrate how UWB wavelets may be shaped so as to allow the encoding of further information thereon. By adding amplitude information to the wavelet shapes already discussed, additional information may be encoded on the wavelets while still requiring only a single time frame to transmit the information. As shown in FIGS. 13A–13D, the wavelets produced by the circuit described in FIGS. 4A and 4B can be used to convey two bits of information if the wavelets are transmitted with one of two different amplitudes. For example, the wavelet illustrated in FIG. 13A may correspond to an encoded data value of '11,' whereas the wavelet illustrated in FIG. 13B, having a smaller amplitude than that wavelet shown in FIG. 13A, may correspond to an encoded data value of '10.' Accordingly, the wavelets shown in FIGS. 13C and 13D may correspond to encoded data values of '00,' and '01,' respectively.

FIGS. 14A–14D similarly show how UWB wavelets having other shapes may also be further encoded with amplitude data. As would be well understood by one of ordinary skill in the art, multiple amplitude values could be used to further encode additional bits of information, and if used in a circuit such as that described in FIG. 10, for example, an entire constellation of values could be represented by the various shapes of UWB wavelets generated.

FIG. 15 is a schematic of a simple, yet very fast, digital to analog device 1601 that can be used to apply amplitude data to either a NRZ data source or pulse streams generated by a pulse generator. As shown in FIG. 15, the simple digital to analog device 1601 uses a current mirror circuit 1501 to generate two current sinks, 1505 and 1507, and it uses two differential pairs, 1520 and 1522 to steer the two currents to differential output nodes $V_{out1}$ 1524 and $V_{out2}$ 1526. As a result, the circuit generates an output voltage according to table 1503. As would be understood by one of ordinary skill in the art, the simple digital to analog device 1601 shown in FIG. 15 is a simple and fast device for generating various output voltage levels that could be used to further encode either the NRZ data stream, or the pulse streams generated by the pulse generator.

Figure 16:
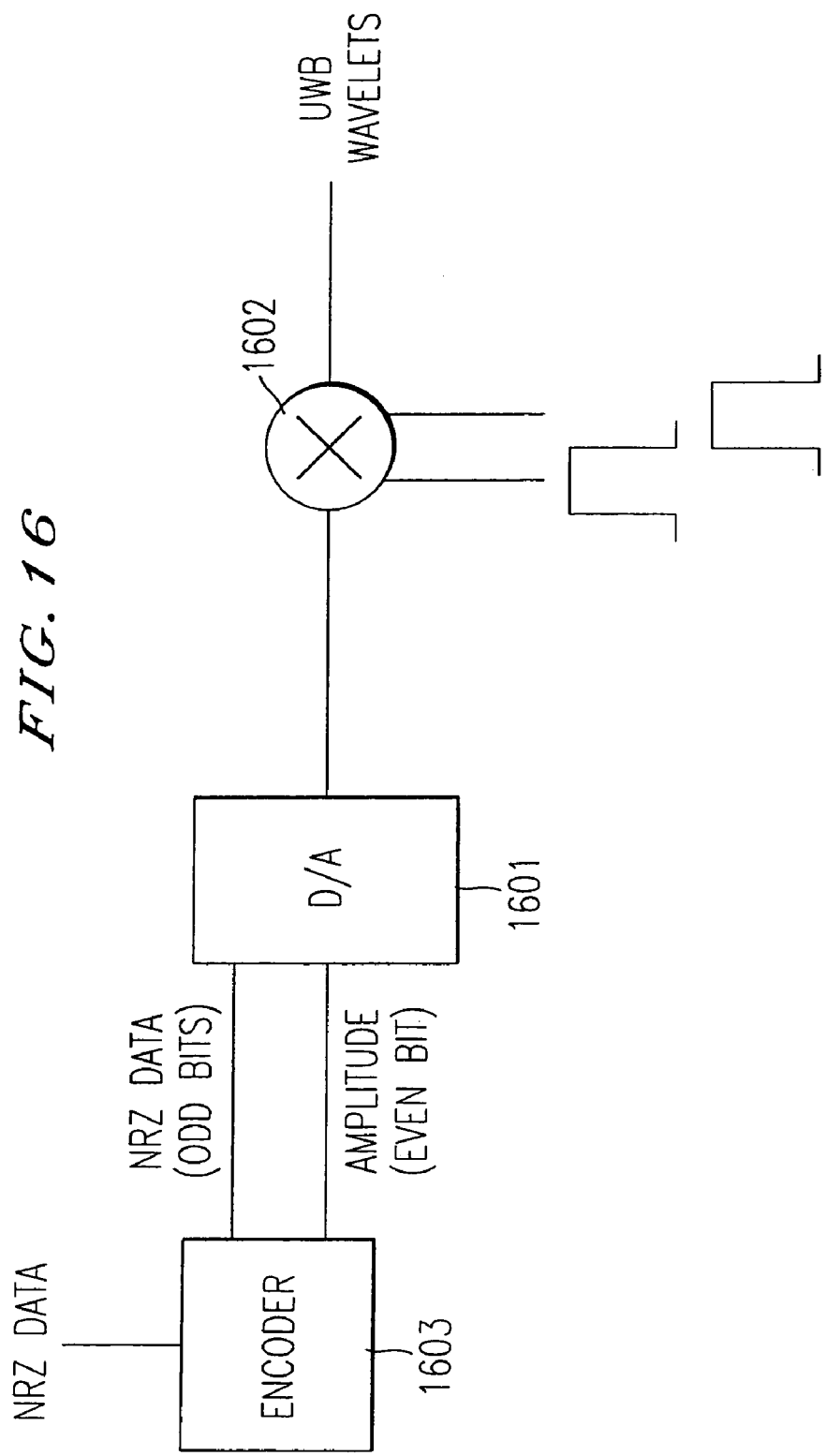
FIG. 16 is a schematic of a UWB wavelet generator for generating wavelets that include encoding in their amplitude with a digital to analog device according to one embodiment of the present invention.

FIG. 16 is a schematic showing an exemplary circuit for using a digital to analog converter (D/A) 1601 and a differential mixer 1602 to generate UWB wavelets having encoded thereon two bits of data. As shown in FIG. 16, multiple bits (e.g., odd and even, or some other interleaved or encoding method output by an encoder 1603) are connected to the D/A 1601, for example, in accordance with table 1503 in FIG. 16. Accordingly, multiple bits are encoded onto individual wavelets as amplitude and phase (0° or 180°) information. The number of distinct amplitude values is determined by the number of bits in the D/A and is not limited to two bits as shown in the exemplary circuit in FIG. 16.

Figure 17:
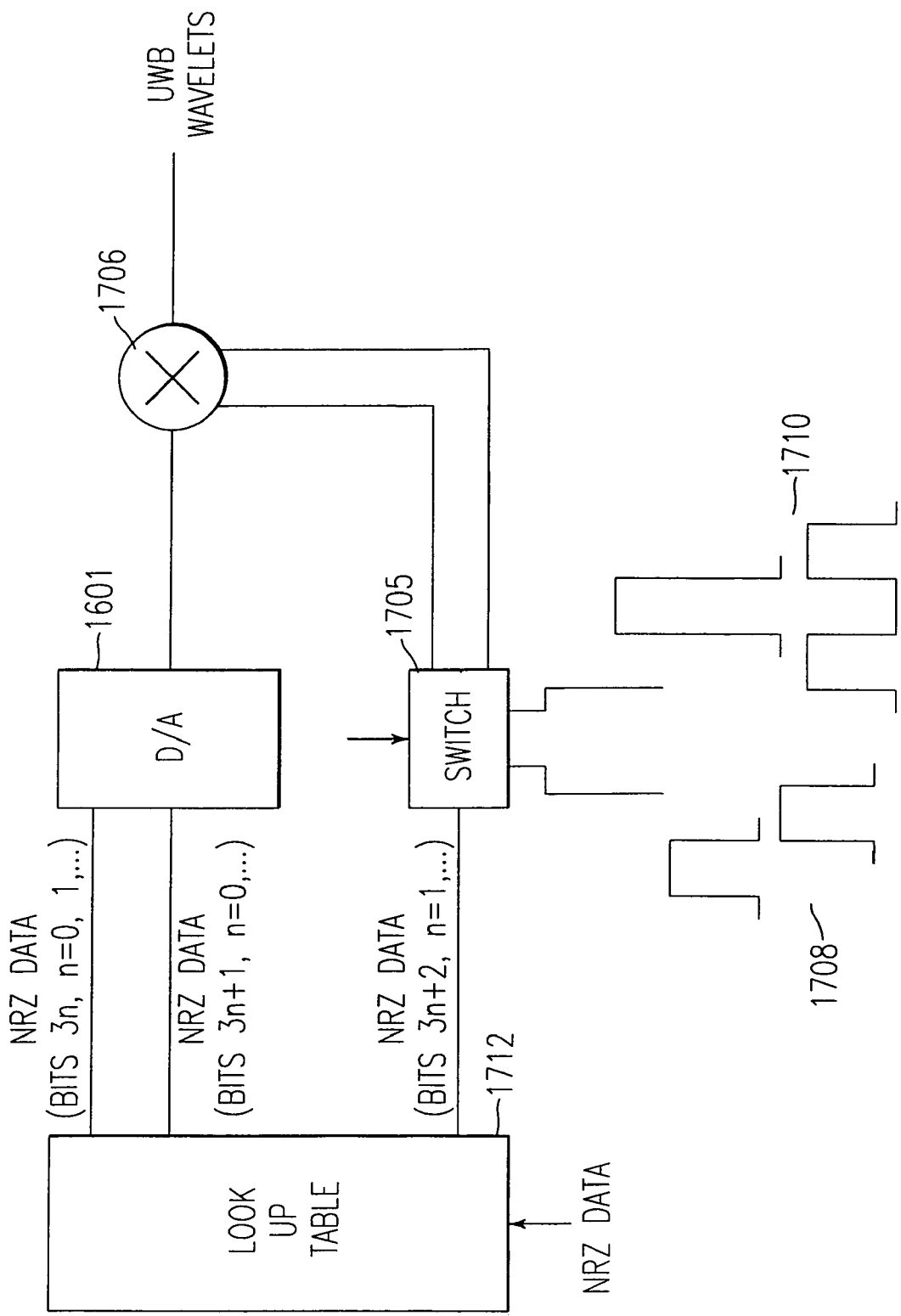
FIG. 17 is a schematic of a UWB wavelet generator that generates wavelets having a constellation of shapes according to one embodiment of the present invention.

FIG. 17 is a schematic illustrating a circuit through which a constellation of shapes of UWB wavelets may be generated to encode three bits of data. As shown in FIG. 17, a lookup table 1712 receives the NRZ data stream and encodes a group of data bits to drive the D/A 1601 and switch 1705 combination. The switch 1705 is configured to select one of two orthogonal drive waveforms 1708, 1710 to couple to one input port of the mixer 1706. D/A 1601 is configured to drive various amplitudes into another input port of the mixer 1706. The output of the mixer 1706 is a constellation of multi-amplitude, quadrature-phase, zero mean, UWB wavelets that are generated at extremely high rates. As would be understood by one of ordinary skill in the art, many variations of the circuit shown in FIG. 17 are possible. For example, by applying a D/A to both NRZ inputs shown in FIG. 10, more than the four phases described could be added to the multi-amplitude modulation to encode more bits of information. Furthermore, other variations could be made to the shapes and amplitudes of the data being encoded.

Figure 18:
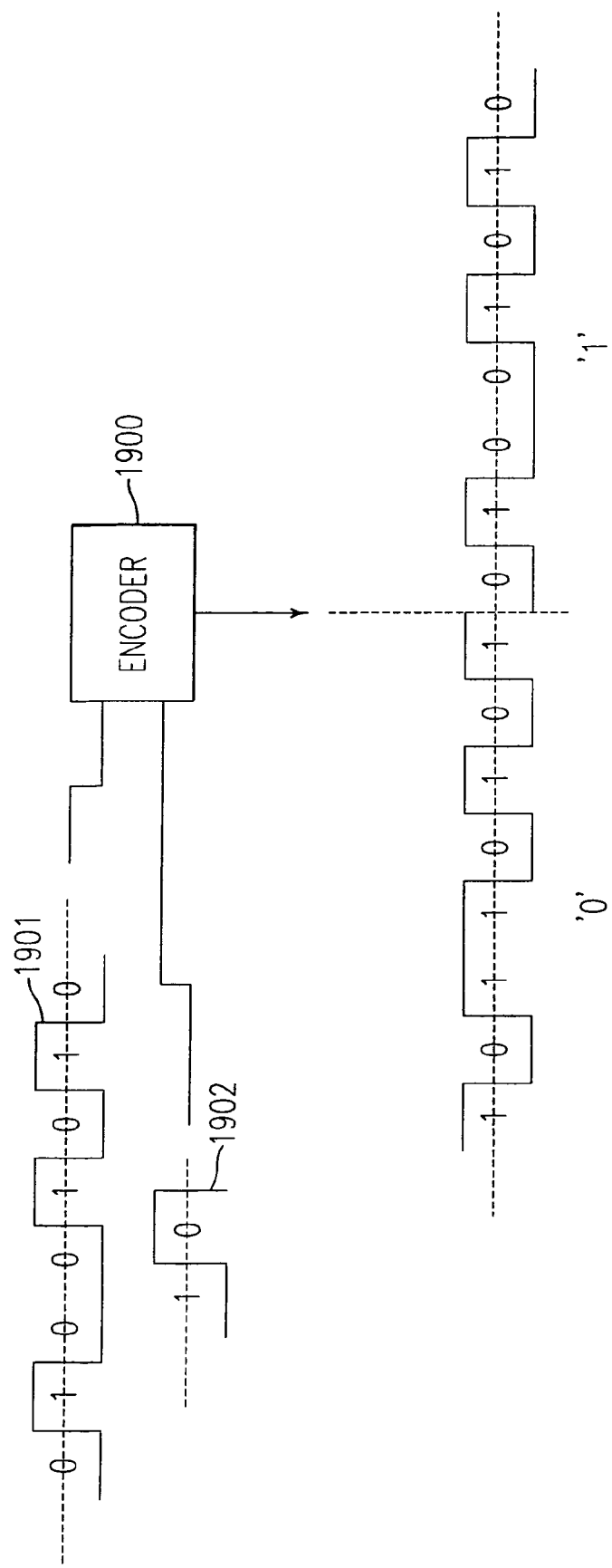
FIG. 18 illustrates an encoding of data with a multi-bit user code according to one embodiment of the present invention.

FIG. 18 illustrates an approach whereby a single bit of information is encoded as a group of several wavelets (or chips), where the group corresponds to a unique user code 1901 (e.g., '0100 1010'). As shown in FIG. 18, the encoder 1900 multiplies the unique user code 1901 with each bit of data 1902 to be transmitted. A data value of '0' will be encoded as an inverted representation of the user code 1901 (e.g., '1011 0101'), whereas a data value of '1' will be encoded as the sequence of chips that make up the user code 1901 (e.g., '0100 1010').

Figure 19:
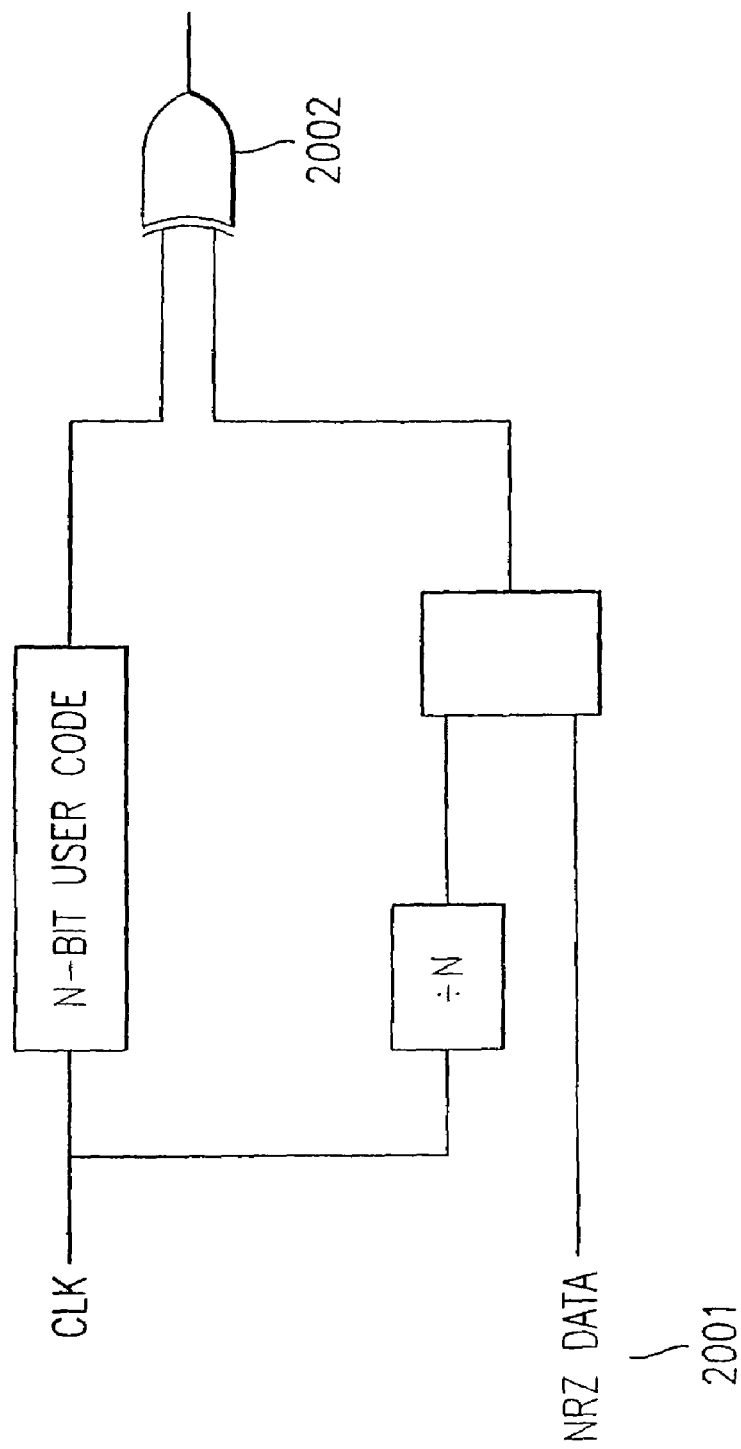
FIG. 19 is a schematic of a circuit for encoding non-return-to-zero data with a user code according to one embodiment of the present invention.

FIG. 19 is a schematic of a circuit implementing the encoding scheme discussed in FIG. 18. As shown in FIG. 19, each bit of data 2001 will be input to an exclusive OR (XOR) gate 2002 along with each bit of the N-bit user code. The output of the XOR 2002 will be the exclusive OR of the data (i.e., '0,' or '1') and the N-bit user code. Accordingly, as described in FIG. 18, a data bit of '0' will cause the output of the XOR gate 2002 to be an inverted representation of the N-bit user code, whereas a data bit of '1' will cause the output of the XOR gate 2002 to be the same bit sequence as the N-bit user code. As would be well understood by one of ordinary skill in the art, many variations of this encoding scheme may be employed. For example, in another embodiment of the present invention, the N-bit user code is encoded M times for each bit of data to be transmitted.

Obviously, numerous modifications and variations of the present invention are possible in light of the above teachings. It is therefore to be understood that within the scope of the appended claims, the invention may be practiced otherwise than as specifically described herein.

What is claimed is:

1. A system for generating shaped ultra wideband wavelets, comprising:
   a differential mixer having a first input, a second input and an output, said second input being a differential input having a first differential input and a second differential input, said first input being configured to receive non-return-to-zero data from a source; and
   a pulse generator configured to generate a pulse sequence having at least two pulses in a predetermined pattern, wherein
   at least one of said at least two pulses being input to the first differential input, and another one of said at least two pulses being input to the second differential input, and
   said differential mixer being configured to provide said shaped ultra wideband wavelets at said output of said differential mixer.

2. The system of claim 1, wherein:
   at least one of said first input and said output of said differential mixer being a differential terminal.

3. The system of claim 1, wherein:
   the first input and the second input of said differential mixer being configured to receive digital waveforms.

4. The system of claim 1, wherein:
   the differential mixer being a Gilbert cell mixer.

5. The system of claim 1, wherein:
   the differential mixer being a FET bridge mixer.

6. The system of claim 1, wherein:
   the differential mixer being a diode bridge mixer.

7. The system of claim 1, wherein:
   said pulse sequence comprises an early pulse and a late pulse, said late pulse being applied to said differential mixer after said early pulse;
   said early pulse being input to said first differential input of said differential mixer and said late pulse being input to said second differential input of said second input; and
   said shaped ultra wideband wavelets being bi-phase wavelets.

8. The system of claim 7, wherein:
   said first input being configured to receive non-return-to-zero data that includes multi-level non-return-to-zero data pulses, having at least two amplitude levels; and
   said shaped ultra wideband wavelets being multi-level bi-phase wavelets.

9. The system of claim 8, further comprising:
   a digital-to-analog converter configured to receive said data and set an amplitude level of a waveform applied to the first input, said amplitude level corresponding to a value of said data.

10. The system of claim 7, wherein:
    said pulse sequence comprises a multi-level pulse sequence, having at least two amplitude levels; and
    said shaped ultra wideband wavelets being multi-level bi-phase wavelets.

11. The system of claim 10, further comprising:
    a digital-to-analog converter configured to receive said data and set an amplitude level of a waveform applied to the first input, said amplitude level corresponding to a value of said data.

12. The system of claim 1, wherein:
    said pulse sequence comprises an early pulse, a mid pulse occurring behind said early pulse, and a late pulse occurring behind said mid pulse,
    said mid pulse being applied to said first differential input of said differential mixer and said early pulse and said late pulse being applied to said second differential input of said differential mixer, and
    said shaped ultra wideband wavelets being quad-phase wavelets.

13. The system of claim 12, wherein:
    said first input being configured to receive non-return-to-zero data that includes multi-level non-return-to-zero data pulses, having at least two amplitude levels; and
    said shaped ultra wideband wavelets being multi-level quad-phase wavelets.

14. The system of claim 12, further comprising:
    a digital-to-analog converter configured to receive said data and set an amplitude level of a waveform applied to the first input, said amplitude level corresponding to a value of said data.

15. The system of claim 12, wherein:
    said pulse sequence comprises a multi-level pulse sequence, having at least two amplitude levels, and
    said shaped ultra wideband wavelets being multi-level quad-phase wavelets.

16. The system of claim 15, further comprising:
    a digital-to-analog converter configured to convert at least one data bit into said at least two amplitude levels.

17. The system of claim 1,
    wherein the differential mixer is a first differential mixer, the pulse generator is a first pulse generator, and the pulse sequence is a first pulse sequence,
    the system further comprising:
    a second differential mixer having a first input, a second input and an output, said second input of the second differential mixer is a differential input having a first differential input and a second differential input, said first input of said second differential mixer being configured to receive non-return-to-zero data from the source;

a second pulse generator configured to generate a second pulse sequence having at least two pulses in a second predetermined pattern; and a summer having a first input, a second input and an output, wherein at least one of said at least two pulses generated by said second pulse generator being input to the first differential input of said second input of said second differential mixer, and a different at least one of said at least two pulses generated by said second pulse generator being input to the second differential input of said second input of said second differential mixer, said output of said first differential mixer being applied to said first input of said summer and said output of said second differential mixer being applied to said second input of said summer, and said shaped ultra wideband wavelets being output at said output of said summer and each of said shaped ultra wideband wavelets being one of a constellation of multi-amplitude and multi-phase shapes corresponding to a data value of the data.

18. The system of claim 17, further comprising:

a look-up table having an input, a first output, and a second output, the input of the look-up table being configured to receive non-return-to-zero data from the source;

a first digital/analog converter having an input and an output, the input of the first digital/analog converter being connected to the first output of the look-up table, and the output of the first digital/analog converter being connected to the first input of the differential mixer; and a second digital/analog converter having an input and an output, the input of the second digital/analog converter being connected to the second output of the look-up table, and the output of the second digital/analog converter being connected to the first input of the second differential mixer.

19. The system of claim 1, wherein the pulse generator is a first pulse generator, and the pulse sequence is a first pulse sequence, the system further comprising:

a switch having a first input port, a second input port, an output port, and a control input having a first setting and a second setting; and a second pulse generator configured to generate a second pulse sequence having at least two pulses in a second predetermined pattern; wherein a portion of the data from the source being coupled to the control input of the switch, the first pulse sequence is coupled to the first input port of the switch, the second pulse sequence is coupled to the second input port of the switch, at least one of the at least two pulses generated by the first pulse generator is input to the first differential input of the differential mixer, and another at least one of the at least two pulses generated by the first pulse generator is input to the second differential input of the differential mixer when the control input is set to the first setting, at least one of the at least two pulses generated by the second pulse generator is input to the first differential input of the differential mixer, and another at least one of the at least two pulses generated by the second pulse generator is input to the second differential input of the differential mixer when the control input is set to the second setting, and the shaped ultra wideband wavelets being output at the output of the differential mixer being one of a constellation of multi-amplitude and four-phase shapes corresponding to a data value of the data.

20. The system of claim 19, further comprising:

a look-up table having an input, a first output, and a second output, the input of the look-up table being configured to receive non-return-to-zero data from the source, and the first output being connected to the first input port of the switch;

a digital/analog converter having an input and an output, the input of the first digital/analog converter being connected to the second output of the look-up table, and the output of the first digital/analog converter being connected to the first input of the differential mixer; and the shaped ultra wideband wavelets being output at the output of the differential mixer being one of a constellation of multi-amplitude and four-phase shapes corresponding to a data value of the data.

21. The system of claim 1, further comprising:

an encoder configured to encode a bit of data into a plurality of bits corresponding to a code, wherein the plurality of bits corresponding to the code represents a first data value, and an inverted version of the plurality of bits corresponding to the code represents a second data value.

22. A method for generating shaped ultra wideband wavelets, comprising the steps of:

encoding data from a data source as a non-return-to-zero sequence of pulses;

generating a pulse sequence having at least two pulses, and having a predetermined pattern; and mixing the non-return-to-zero sequence of pulses with the pulse sequence to produce a sequence of shaped ultra wideband wavelets in a radio frequency, each wavelet having a predetermined shape having the data encoded therein.

23. A method for generating shaped ultra wideband wavelets, comprising the steps of:

encoding data from a data source as a non-return-to-zero sequence of pulses;

generating a pulse sequence having at least two pulses, and having a predetermined pattern; and mixing the non-return-to-zero sequence of pulses with the pulse sequence to produce a sequence of shaped ultra wideband wavelets, each wavelet having a predetermined shape having the data encoded therein, wherein at least one of the at least two pulses is input to a first differential input of a mixer, and another one of the at least two pulses is input to a second differential input of the mixer.

24. The method of claim 23, wherein:

the pulse sequence comprises an early pulse and a late pulse, the late pulse being applied to the mixer after the early pulse;

the early pulse is input to the first differential input of the mixer and the late pulse is input to the second differential input of the mixer; and the shaped ultra wideband wavelets are bi-phase wavelets.

25. The method of claim 24, wherein:

the non-return-to-zero sequence of pulses comprises a multi-level non-return-to-zero sequence of pulses having at least two amplitude levels; and the shaped ultra-wideband wavelets are multi-level bi-phase wavelets.

26. The method of claim 24, wherein:

the pulse sequence comprises a multi-level pulse sequence having at least two amplitude levels; and the shaped ultra wideband wavelets are multi-level bi-phase wavelets.

27. The method of claim 23, wherein:

the pulse sequence comprises an early pulse, a mid pulse occurring after the early pulse, and a late pulse occurring behind the mid pulse;

the mid pulse is input to the first differential input of the mixer and the early pulse and the late pulse are input to the second differential input of the mixer; and the shaped ultra wideband wavelets are quad-phase wavelets.

28. The method of claim 27, wherein:

the non-return-to-zero sequence of pulses comprises a multi-level non-return-to-zero sequence of pulses having at least two amplitude levels; and the shaped ultra-wideband wavelets are multi-level quad-phase wavelets.

29. The method of claim 27, wherein:

the pulse sequence comprises a multi-level pulse sequence having at least two amplitude levels; and the shaped ultra wideband wavelets are multi-level quad-phase wavelets.

30. The method of claim 22, wherein the pulse sequence is a first pulse sequence, the method further comprising the steps of:

generating a second pulse sequence having at least two pulses, and having a predetermined pattern;

mixing the non-return-to-zero sequence of pulses with the second pulse sequence;

summing the result of mixing the non-return-to-zero sequence of pulses with the first pulse sequence with the result of mixing the non-return-to-zero sequence of pulses with the second pulse sequence to produce a constellation of multi-amplitude and multi-phase shapes corresponding to a data value of the data.

* * * * *